United States Patent [19]

Akiyama et al.

[11] Patent Number: 5,822,771
[45] Date of Patent: Oct. 13, 1998

[54] SYSTEM FOR MANAGEMENT OF SOFTWARE EMPLOYING MEMORY FOR PROCESSING UNIT WITH REGULATORY INFORMATION, FOR LIMITING AMOUNT OF USE AND NUMBER OF BACKUP COPIES OF SOFTWARE

[75] Inventors: Ryota Akiyama; Naoya Torii, both of Kawasaki, Japan

[73] Assignee: Fujitsu Limited, Kawasaki, Japan

[21] Appl. No.: 858,557

[22] Filed: May 19, 1997

Related U.S. Application Data

[63] Continuation of Ser. No. 710,883, Sep. 23, 1996, abandoned, which is a continuation of Ser. No. 231,479, Apr. 22, 1994, abandoned.

[30] Foreign Application Priority Data

May 14, 1993 [JP] Japan .................................. 5-112882

[51] Int. Cl.$^6$ ..................................................... G06F 12/14
[52] U.S. Cl. ........................... 711/162; 711/152; 711/161; 711/163; 395/726
[58] Field of Search .................................. 711/152, 163, 711/161, 162; 395/726, 186; 380/4, 3

[56] References Cited

U.S. PATENT DOCUMENTS

| | | | |
|---|---|---|---|
| 3,857,018 | 12/1974 | Stark et al. .............................. | 235/382 |
| 4,553,252 | 11/1985 | Egendorf .................................. | 377/15 |
| 4,593,376 | 6/1986 | Volk ......................................... | 705/16 |
| 4,642,769 | 2/1987 | Petrofsky ................................. | 607/48 |
| 5,113,518 | 5/1992 | Durst, Jr. et al. ....................... | 395/186 |
| 5,155,680 | 10/1992 | Wiedemer ................................ | 380/4 |
| 5,162,989 | 11/1992 | Matsuda ................................... | 705/1 |
| 5,204,897 | 4/1993 | Wyman .................................... | 380/4 |
| 5,357,573 | 10/1994 | Walters .................................... | 380/25 |
| 5,375,240 | 12/1994 | Grundy .................................... | 395/186 |
| 5,390,297 | 2/1995 | Barber et al. ............................ | 395/187.01 |

FOREIGN PATENT DOCUMENTS

| | | |
|---|---|---|
| 60-024639 | 2/1985 | Japan . |
| 60-201436 | 10/1985 | Japan . |
| 3-144827 | 6/1991 | Japan . |

OTHER PUBLICATIONS

Playing The Smart Card, CommunicationsWeek International, p. 36, Sep. 7, 1992.

*Primary Examiner*—Eddie P. Chan
*Assistant Examiner*—Reginald G. Bragdon
*Attorney, Agent, or Firm*—Staas & Halsey

[57] ABSTRACT

A set of a management-use memory medium in which is written various type of regulatory information (limit I of use of software, limit L of production of the next generation, a number K of generations showing up to what generation backup copies can be produced, software identification information PID, etc.) and a software memory medium in which the software is stored is established and use of the software is allowed under the restrictions of this regulatory information. Further, the software memory medium and the management-use memory medium may be provided in the same memory medium or the two may be constituted as separate memory media. In the case of the latter separate management system, the software is allowed to be used only when the software identification information PID written in the two match. It is therefore possible to suppress the unauthorized use of software without detracting from the spatial convenience of software use.

12 Claims, 23 Drawing Sheets

Fig. 2A
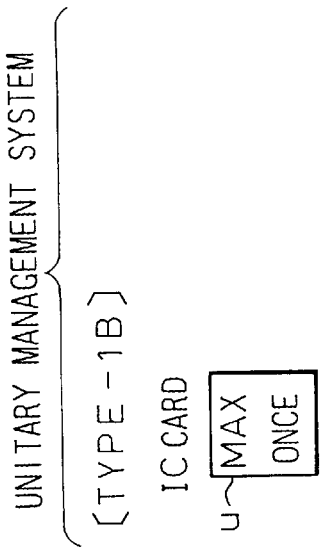
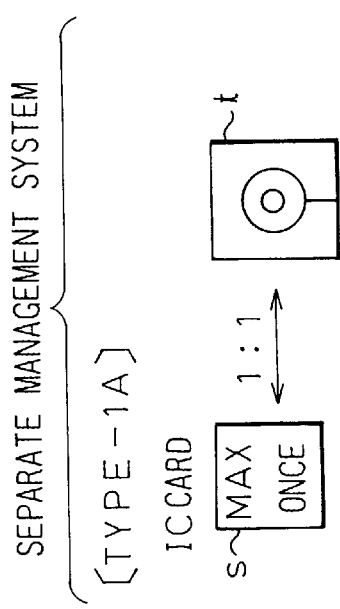
SEPARATE MANAGEMENT SYSTEM
[TYPE-1A]
[TYPE-2A]
s: REGULATORY INFORMATION IS STORED
t, t': SOFTWARE IS STORED
Fig. 2B
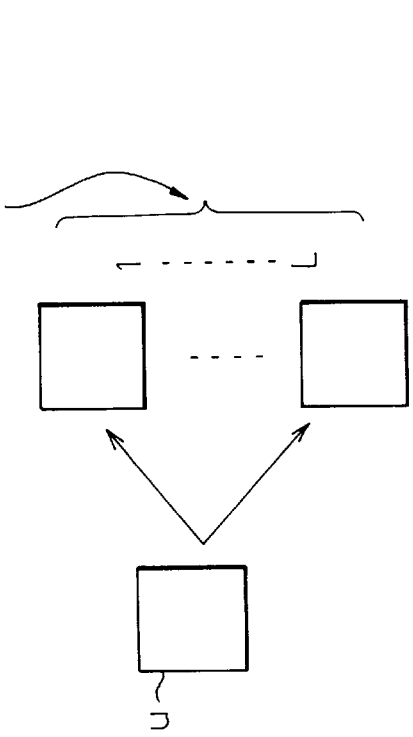
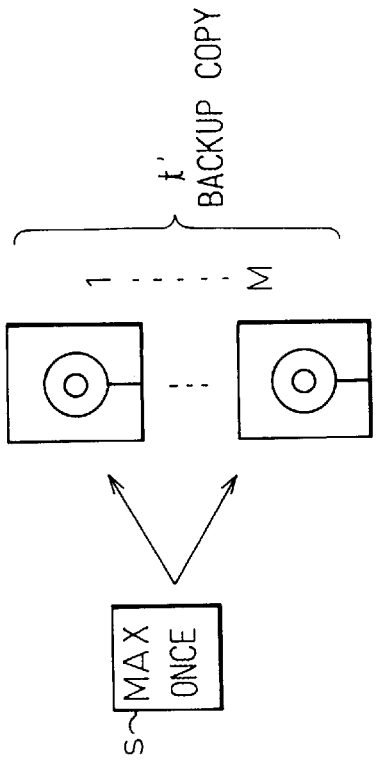
UNITARY MANAGEMENT SYSTEM
[TYPE-1B]
[TYPE-2B]
u, u': BOTH REGULATORY INFORMATION AND SOFTWARE ARE STORED

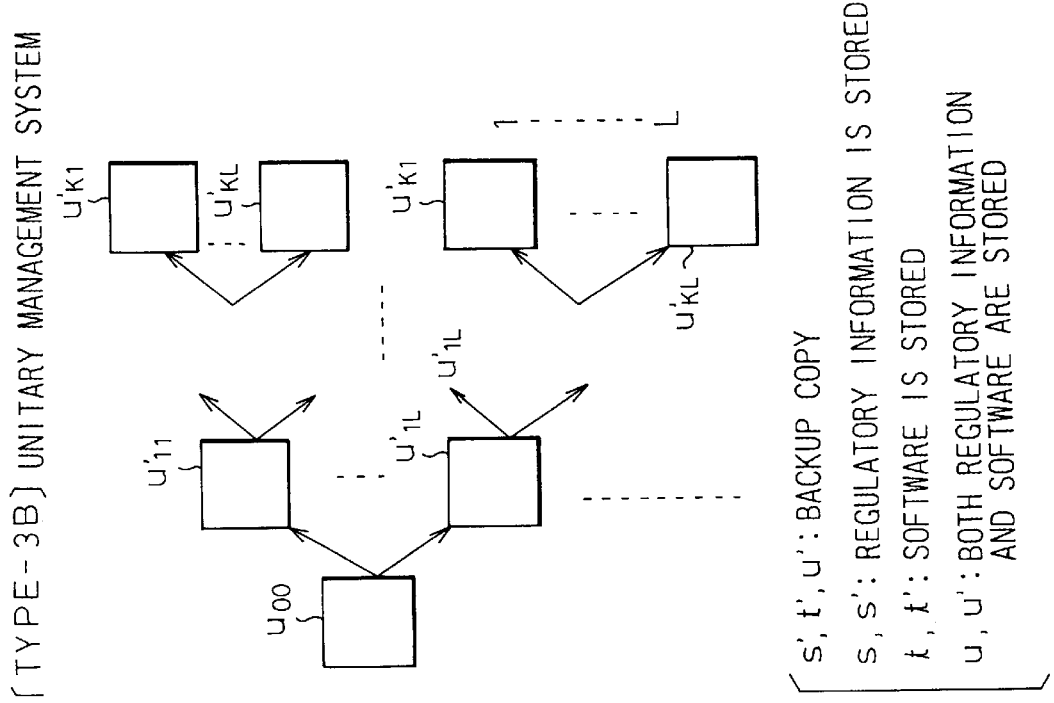
Fig. 3A [TYPE-3A] SEPARATE MANAGEMENT SYSTEM
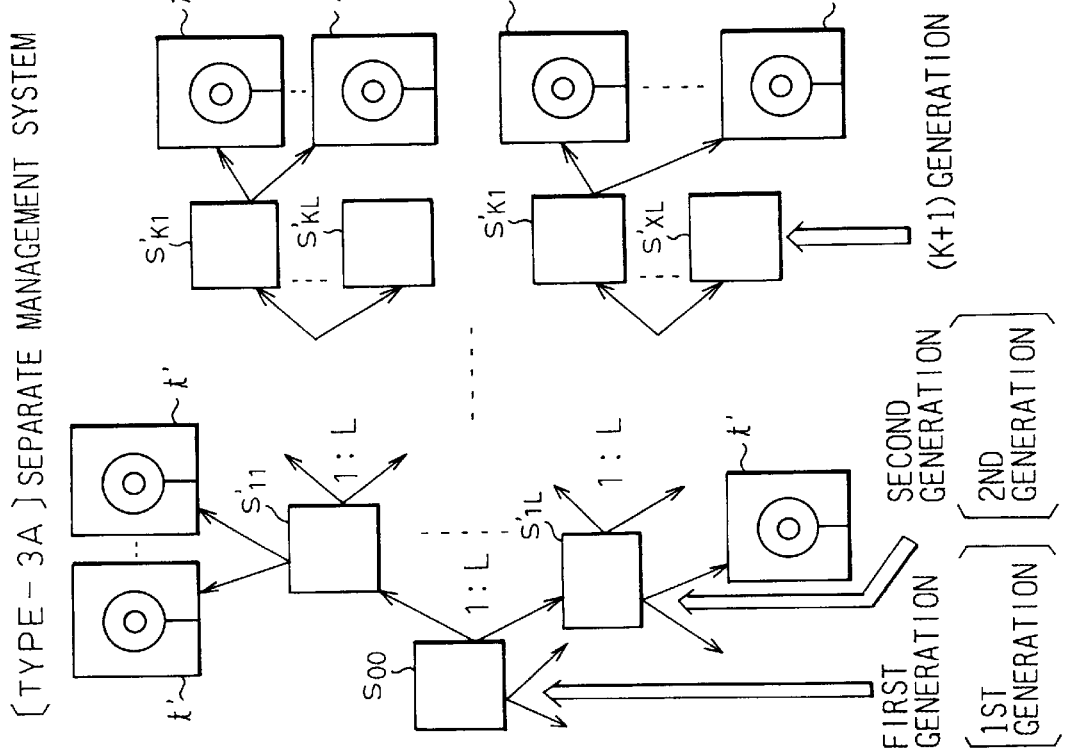
Fig. 3B [TYPE-3B] UNITARY MANAGEMENT SYSTEM

Fig. 4

| SOFTWARE IDENTIFICATION INFORMATION (PID) | LIMIT OF NUMBER OF TIMES OF USE OF SOFTWARE (I) | LIMIT OF PRODUCTION OF NEXT GENERATION (L) | NUMBER OF GENERATIONS (K) | LIMIT OF PRODUCTION OF BACKUP FILES (M) | BASIC RANDOM NUMBER (r) |
|---|---|---|---|---|---|
| (e.g.) A-01 | | | | | |
| TYPE-1A → A-01 | 100 | 0 | 0 | 1 | |
| TYPE-2A → A-01 | 100 | 0 | 0 | 5 | |
| TYPE-3A → A-01 | 100 | 4 | 2 | 2 | |
| TYPE-2B → A-01 | 100 | 1 | 1 | 0 | |

TITLE OF PROGRAM
VERSION NUMBER
LEVEL NUMBER

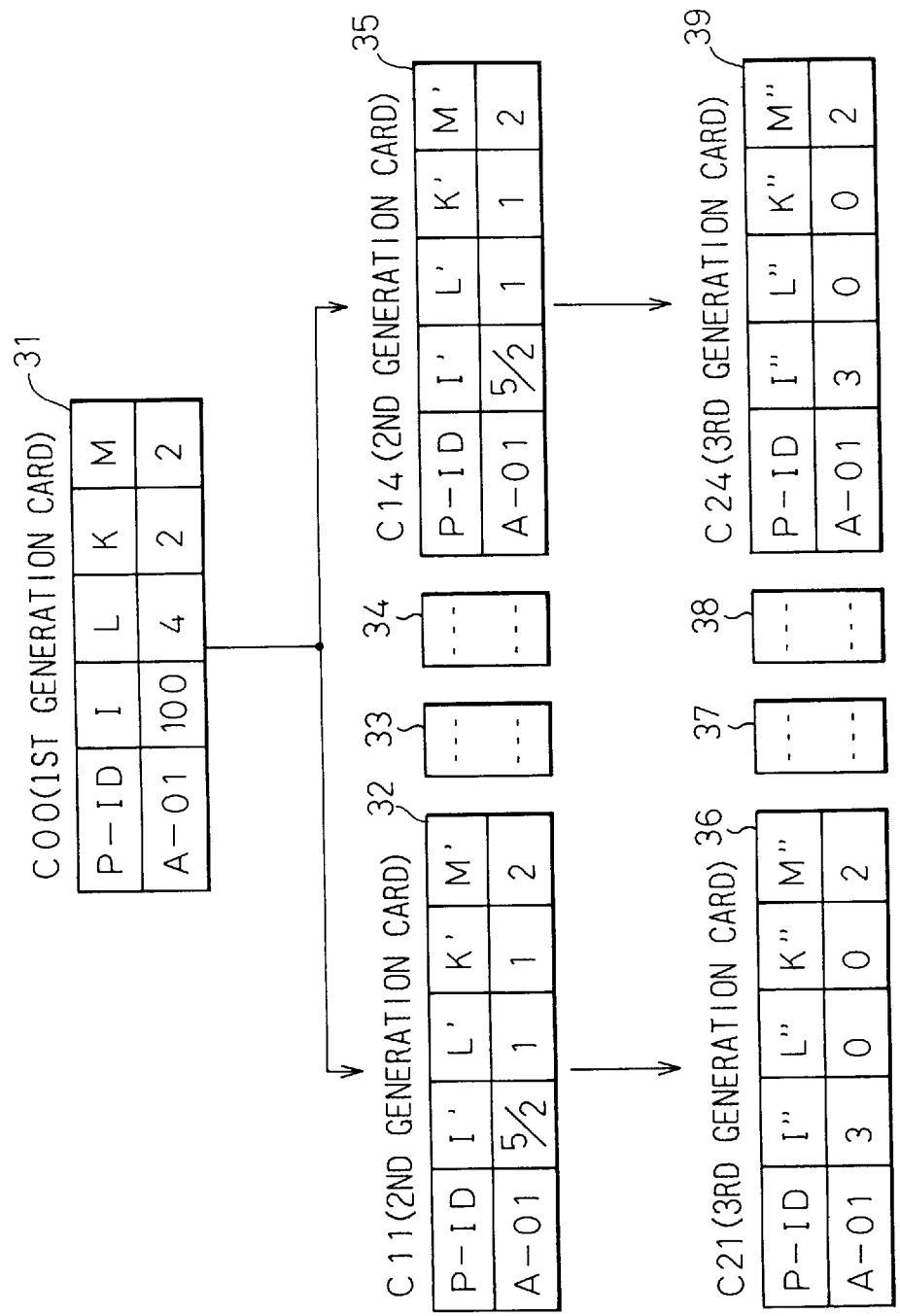

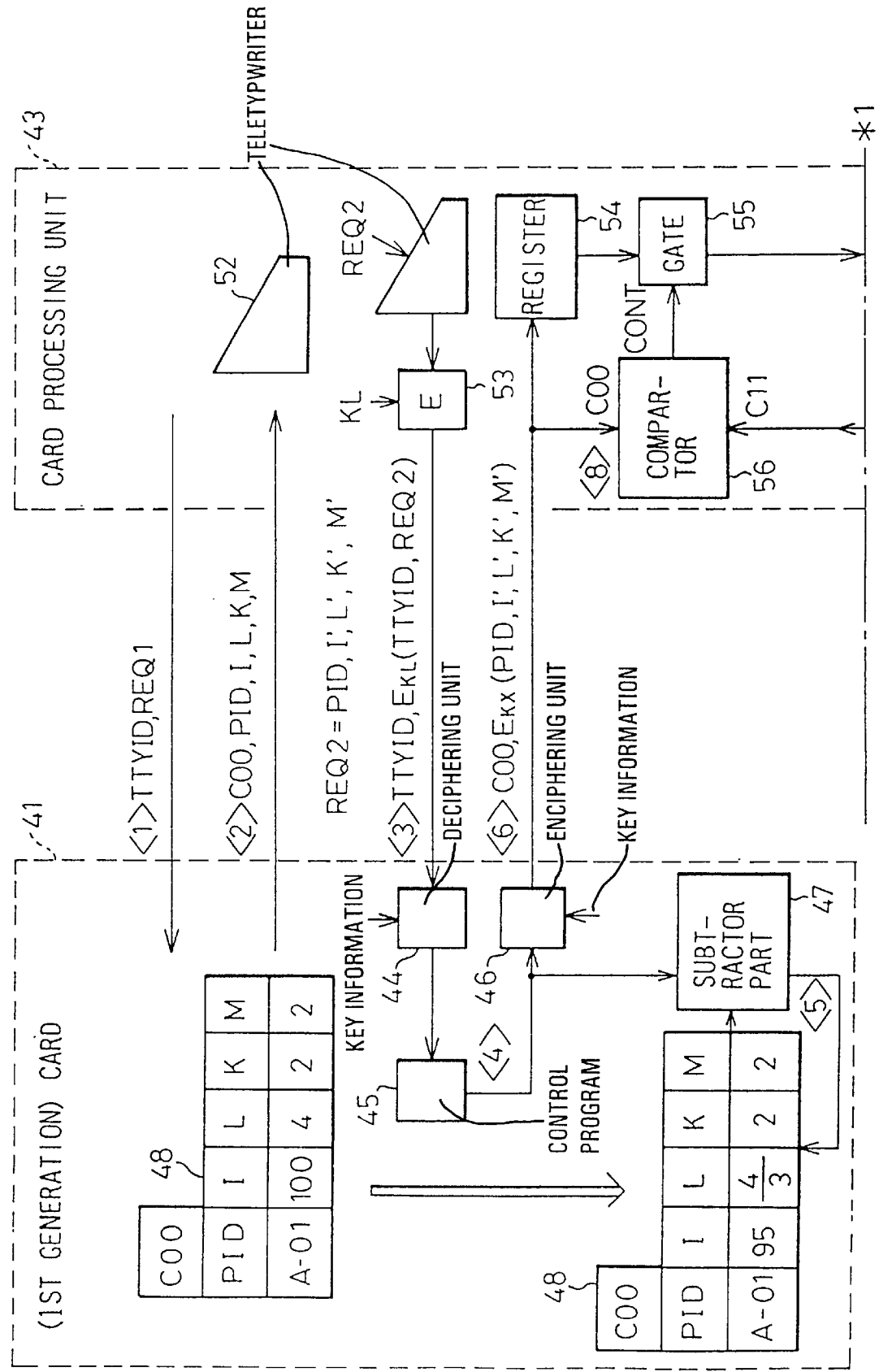

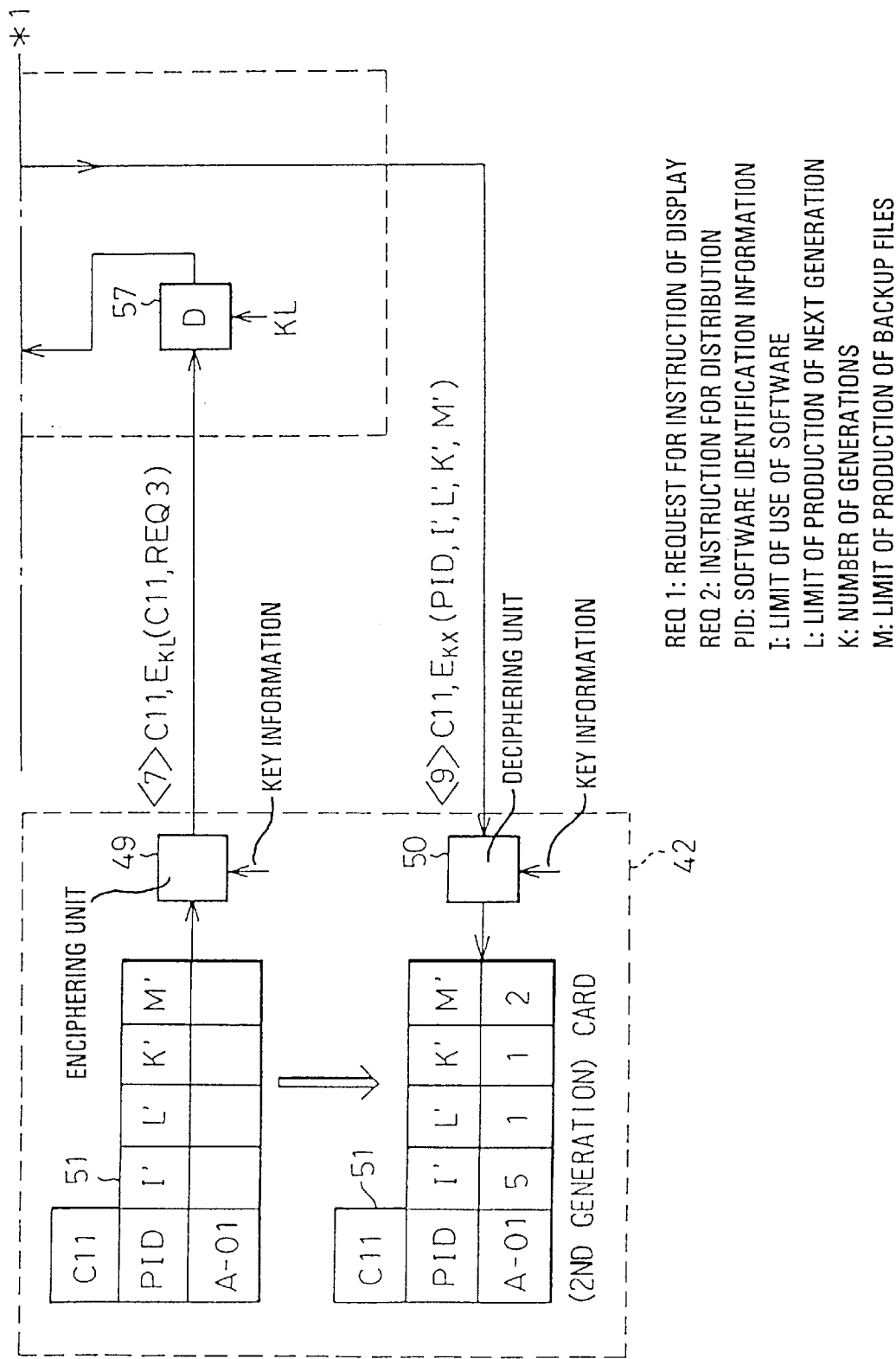

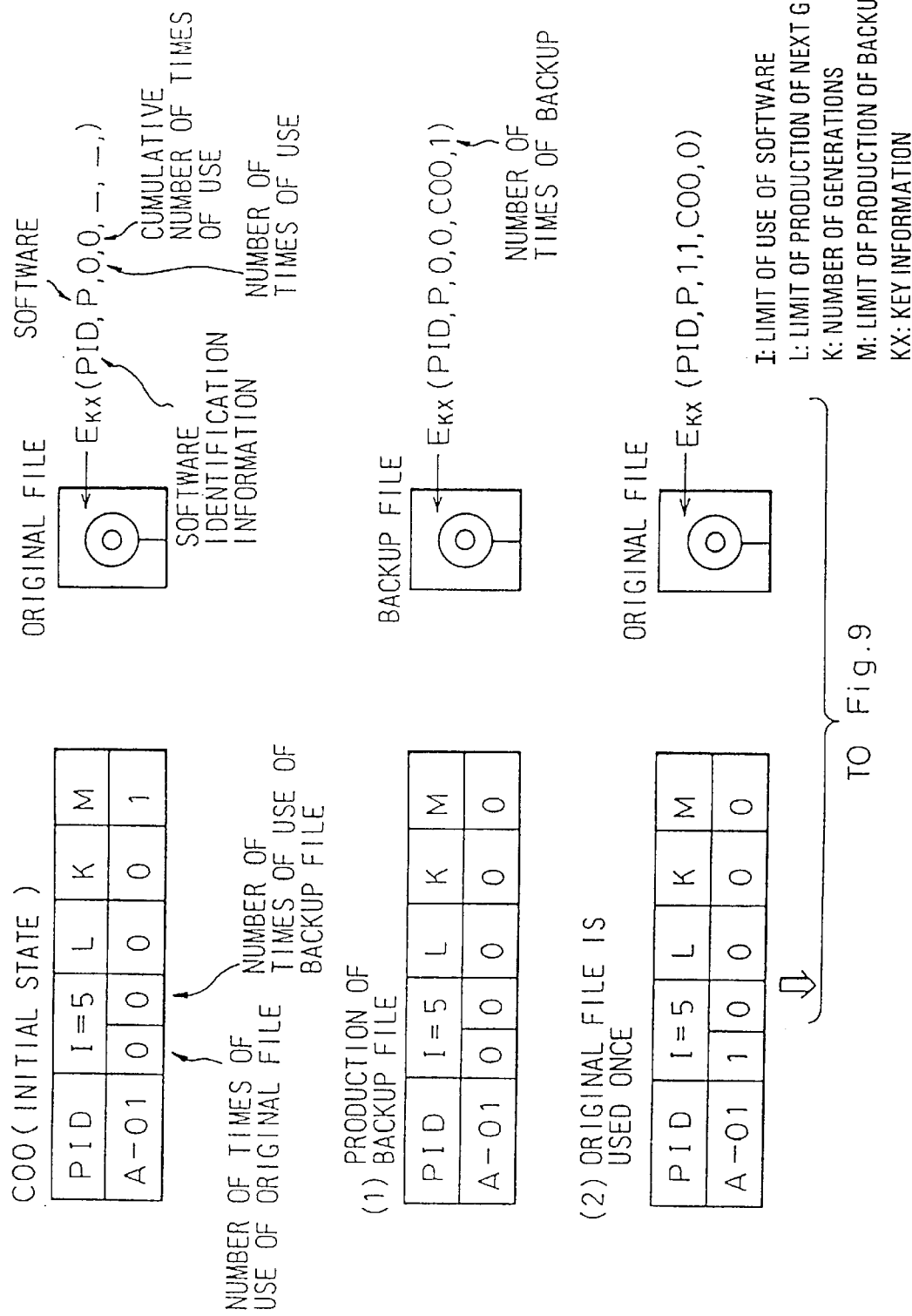

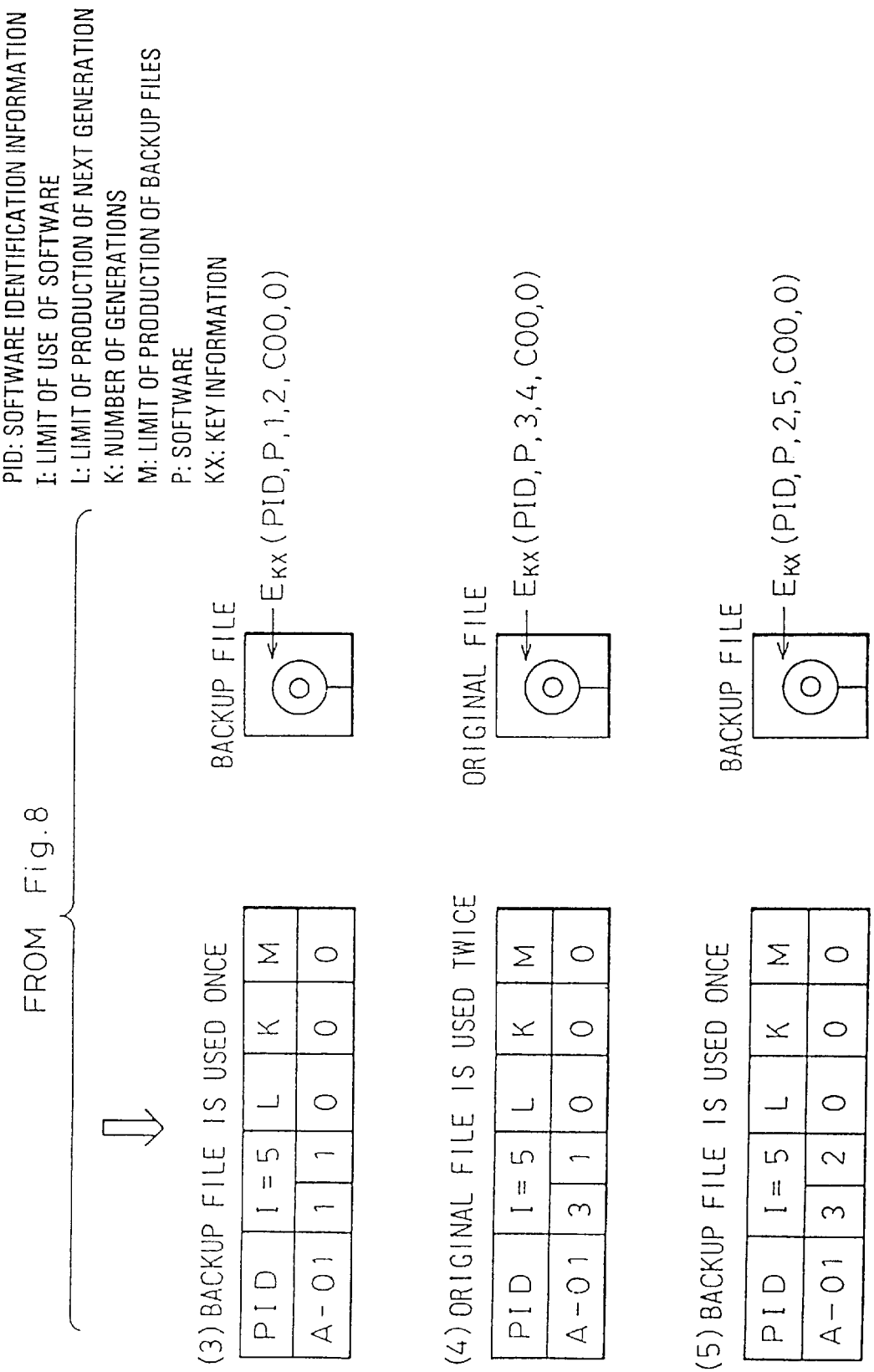

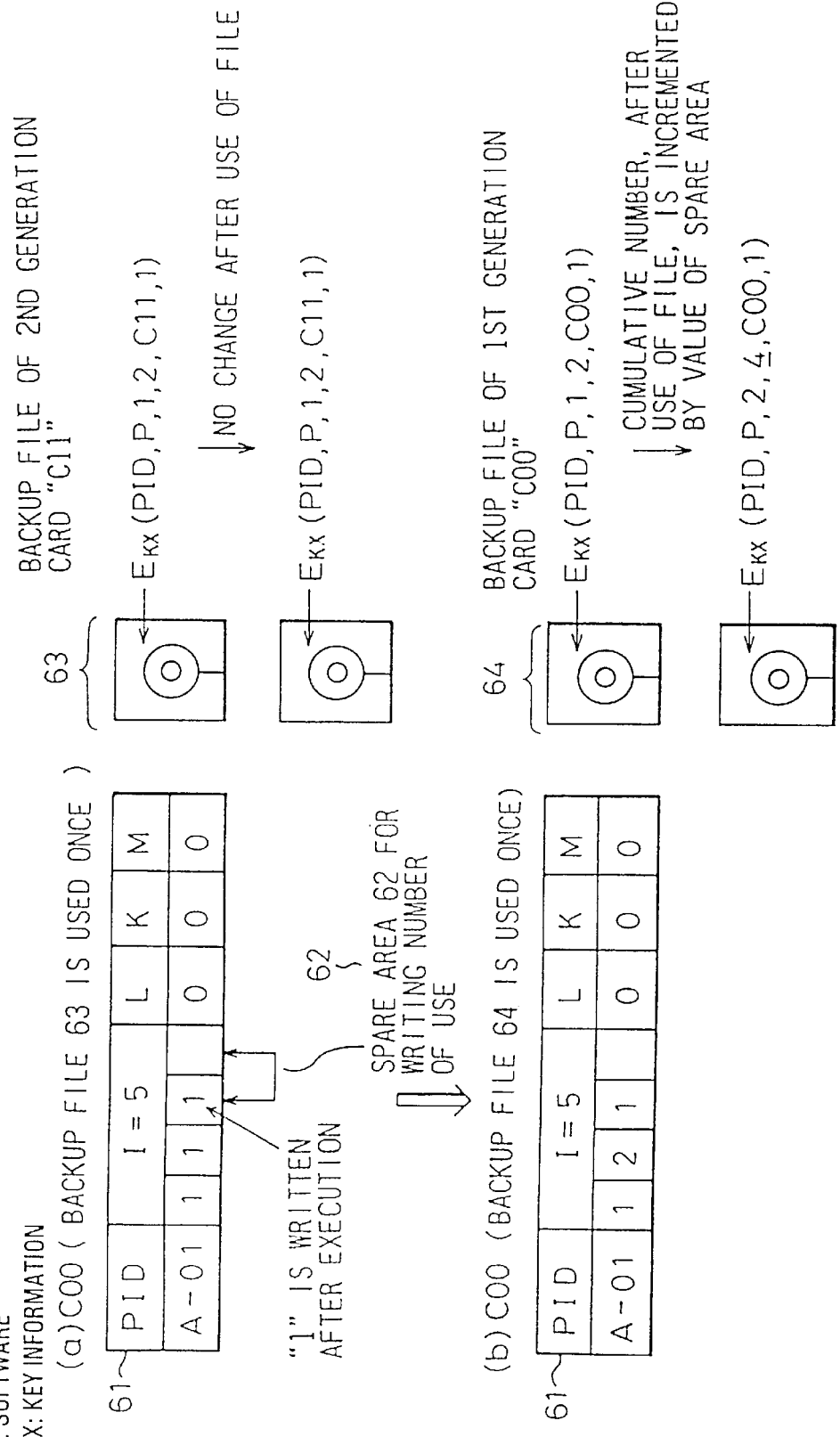

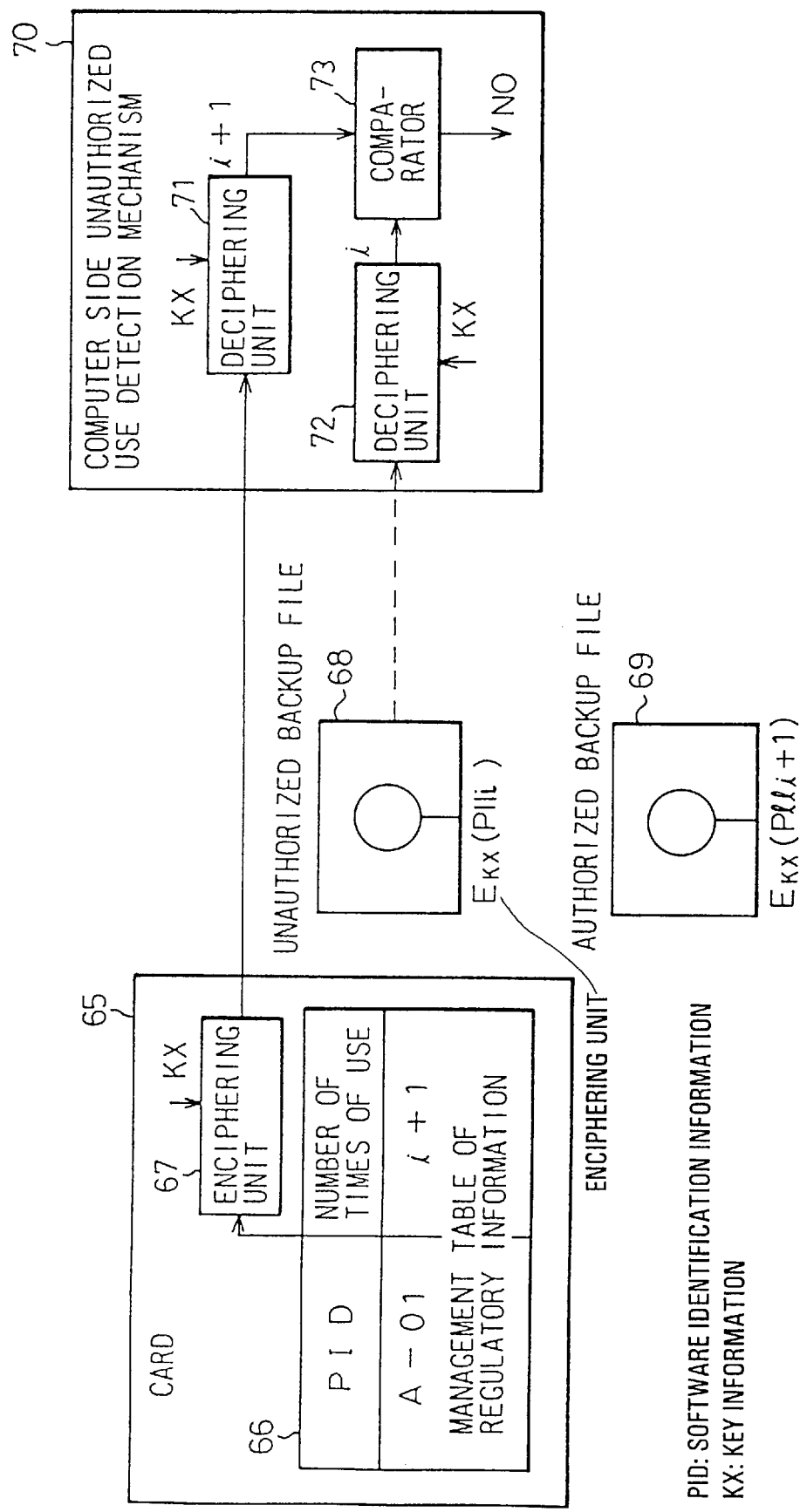

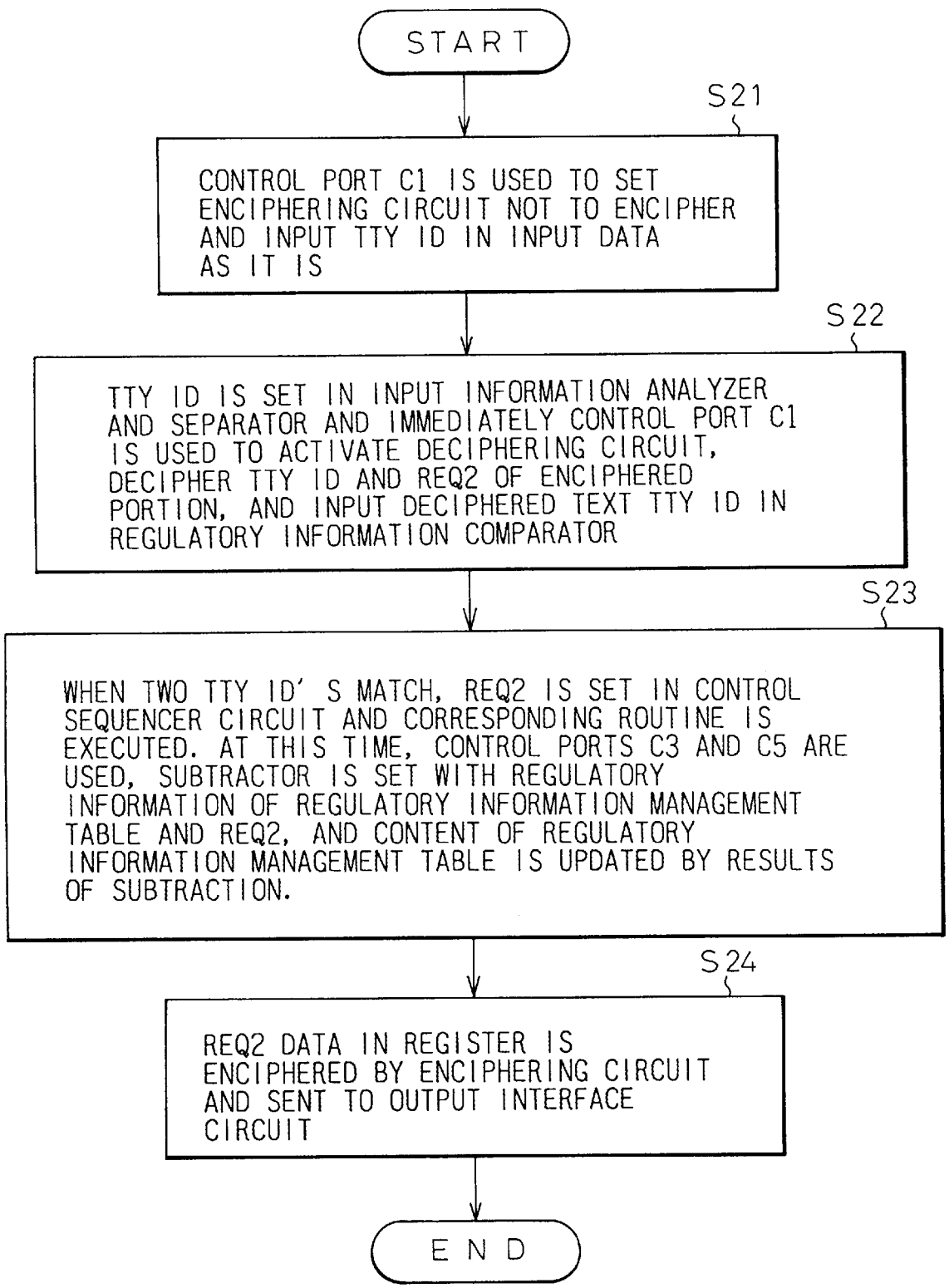

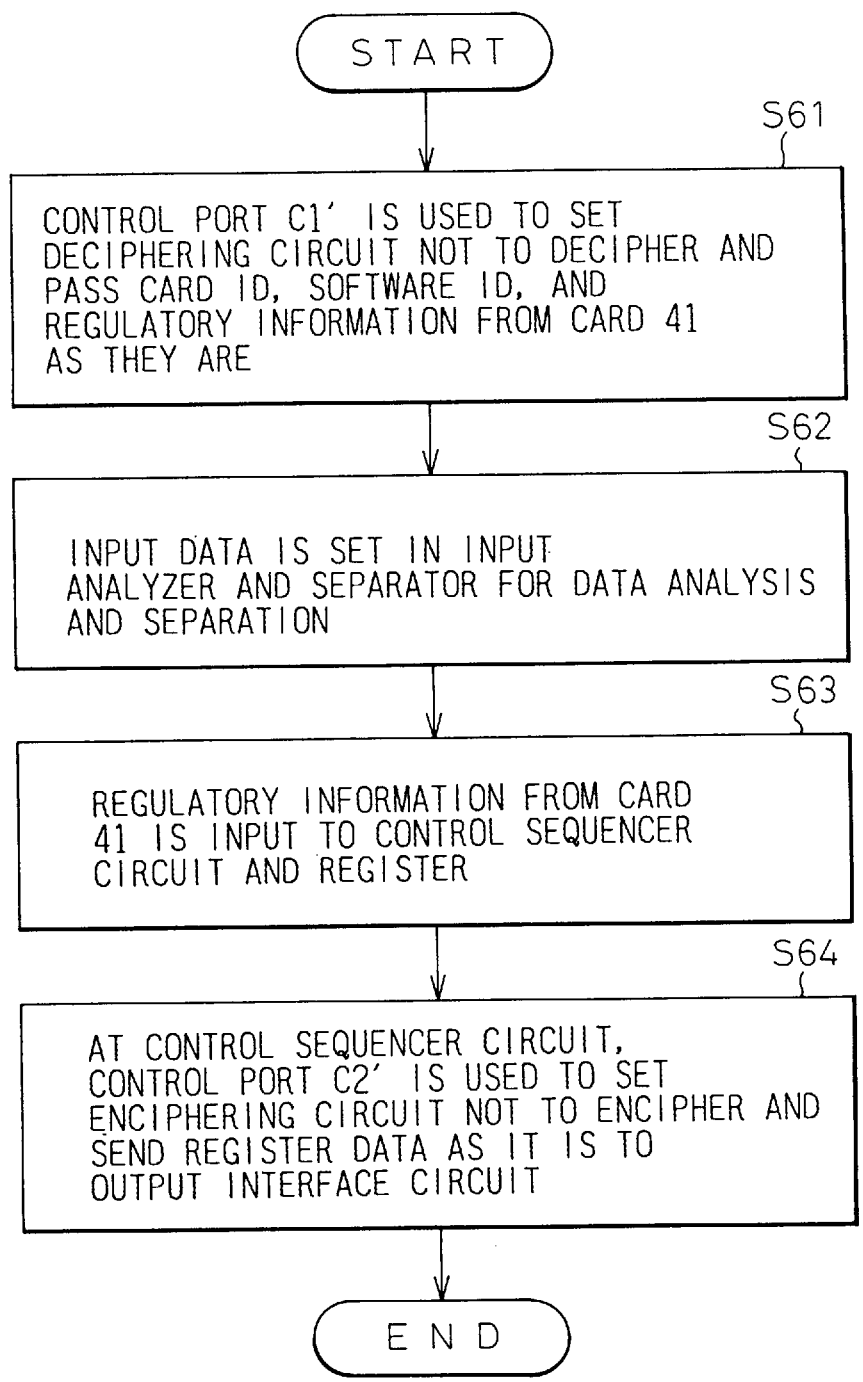

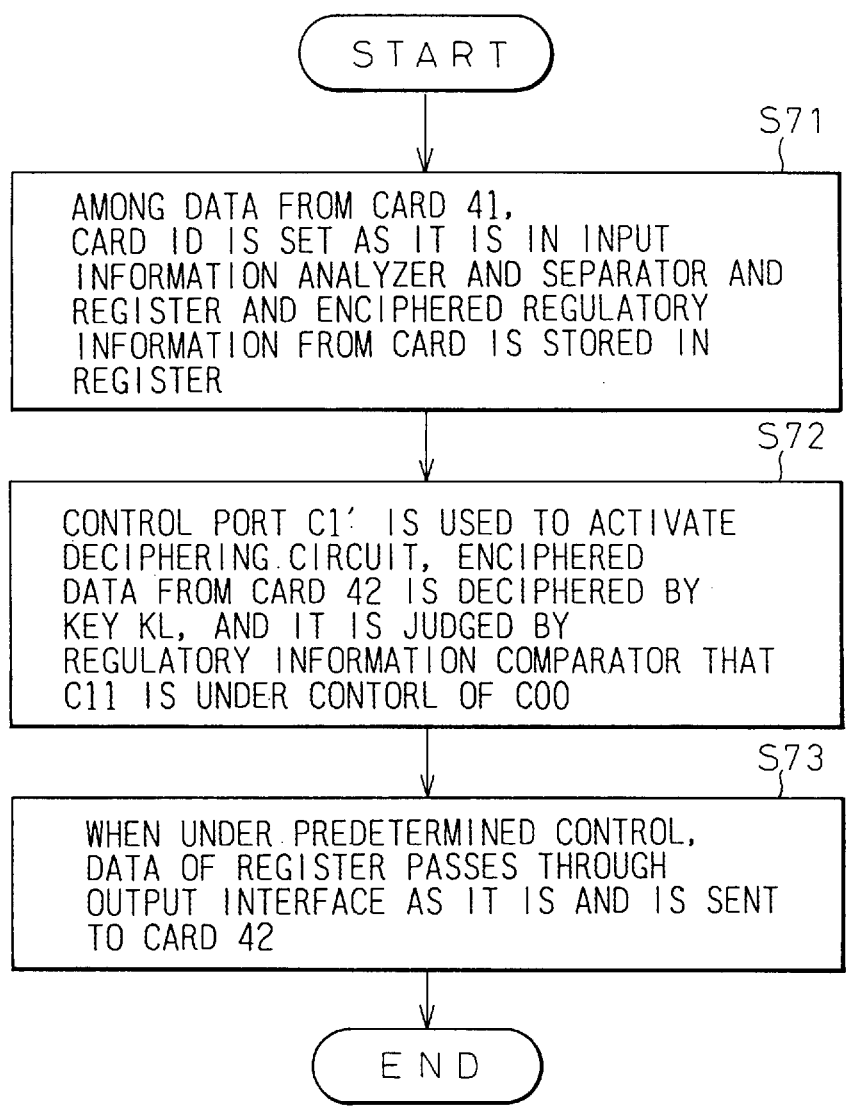

SYSTEM FOR MANAGEMENT OF SOFTWARE EMPLOYING MEMORY FOR PROCESSING UNIT WITH REGULATORY INFORMATION, FOR LIMITING AMOUNT OF USE AND NUMBER OF BACKUP COPIES OF SOFTWARE

This application is a continuation of application Ser. No. 08/710,883 filed Sep. 23, 1996, now abandoned, which is a continuation of application Ser. No. 08/231,479 filed Apr. 22, 1994, now abandoned.

BACKGROUND OF THE INVENTION

1. Field of the Invention

The present invention relates to a system for management of the amount of use of software and a memory medium having a facility for management of the same, more particularly such a system and medium which use a software memory medium unit for storing software and a management-use memory medium unit for writing at least regulatory information showing the limit of use of software, which permit use of the software only within the range of the regulatory information, which reflect into the regulatory information of the management-use memory medium unit the amount of use of software each time the software is used, and which restrict the amount of use of the software after that based on the regulatory information processed to reflect use.

In general, a large amount of time and effort is required for development of the software used for computers, but copies themselves are easy to make. Large numbers of copies of software are made in violation of the software usage agreements between the software vendors and their agents (hereinafter referred to as "independent software vendors (ISV) etc.) and the software users. This creates a situation conducive to unauthorized use of software.

This situation causes reduced sales of software and therefore cuts into the profits which rightfully should accrue to the software vendors and thus, in turn, dampens the enthusiasm for development on the part of the software vendors, so in the past there has been a demand for development of some technical means enabling prevention of such unauthorized use of software separate and apart from the protection of software by copyrights.

The present invention answers this demand.

2. Description of the Related Art

In the past, one means for stopping unauthorized use of software was to incorporate computer identification information into both of the computer and software, that is, to provide computer identification information unique to each set of a computer and a corresponding software.

When using the software, the computer identification information written in the computer and the software were read out and the software made available for use only when the two matched.

Therefore, even if a copy was made from the authorized software, that copy could only be used by the computer specified as meant for use with that software. This enabled prevention of authorized use of copies of software on a large number of computers of the same model.

In this way, the previous system for prevention of unauthorized use of software was based on linkage of the computer and software. As a result, however, even the authorized owner of the software ended up being prevented from using the software on a computer of the same model but with a different computer identification information at a location different from the one with the specific computer linked with the software.

This meant that the inherent advantage of use of software, that is, the "spatial convenience" of being able to use the same software at another computer of the same type at a different location, was impaired. Further, it hindered use in cases where the software was allowed to be used by a large number of users under the terms of an agreement with the software vendor. This presented problems in the past.

SUMMARY OF THE INVENTION

Therefore, the present invention has as its object the suppression of unauthorized use of software without impairing the spatial convenience of software by eliminating the linkage between the computer and software and, instead, providing a management-use memory medium unit in which is written a limit of use of the software, a limit of production of a next generation copy, and other regulatory information, in correspondence with the software memory medium unit and permitting use of the software memory medium unit within the range of the regulatory information.

To attain the above object, the present invention calls for use of a management-use memory medium unit (for example, an IC card) when using software of a software memory medium unit (for example, a floppy disk) and permits use of the software only when the regulatory information written in the management-use memory medium unit is met. Note that the software memory medium unit and the management-use memory medium unit may be provided by a single memory medium (for example, IC card).

BRIEF DESCRIPTION OF THE DRAWINGS

The above object and features of the present invention will be more apparent from the following description of the preferred embodiments with reference to the accompanying drawings, wherein:

FIGS. 2A and 2B are views (part 1) explaining various modes of management of the use of software;

FIGS. 3A and 3B are views (part 2) explaining various modes of management of the use of software;

FIG. 4 is a view explaining a table for management of regulatory information of a first generation card;

FIG. 6 is a view explaining a regulatory information management table of first generation to third generation cards;

FIGS. 7A and 7B are views explaining the procedure for producing a next generation card;

FIG. 8 is a view (part 1) explaining the change of the regulatory information management table when using corresponding software using a first generation card;

FIG. 9 is a view (part 2) explaining the change of the regulatory information management table when using corresponding software using a first generation card;

FIG. 10 is a view explaining the change of the regulatory information management table when using software of a backup file produced by a different card;

FIG. 11 is a view explaining the method of detection of use of an unauthorized backup file;

FIG. 15 is a view explaining the processing procedures of <3> to <5> at the card side of FIGS. 7A and 7B;

FIG. 19 is a view explaining the processing procedures of <2> and <3> at the card processing unit side of FIGS. 7A and 7B; and FIG. 20 is a view explaining the processing procedures of <6> to <8> at the card processing unit side of FIGS. 7A and 7B,

DESCRIPTION OF THE PREFERRED EMBODIMENTS

The embodiments of the present invention will now be described with reference to the related figures.

Figure 1:
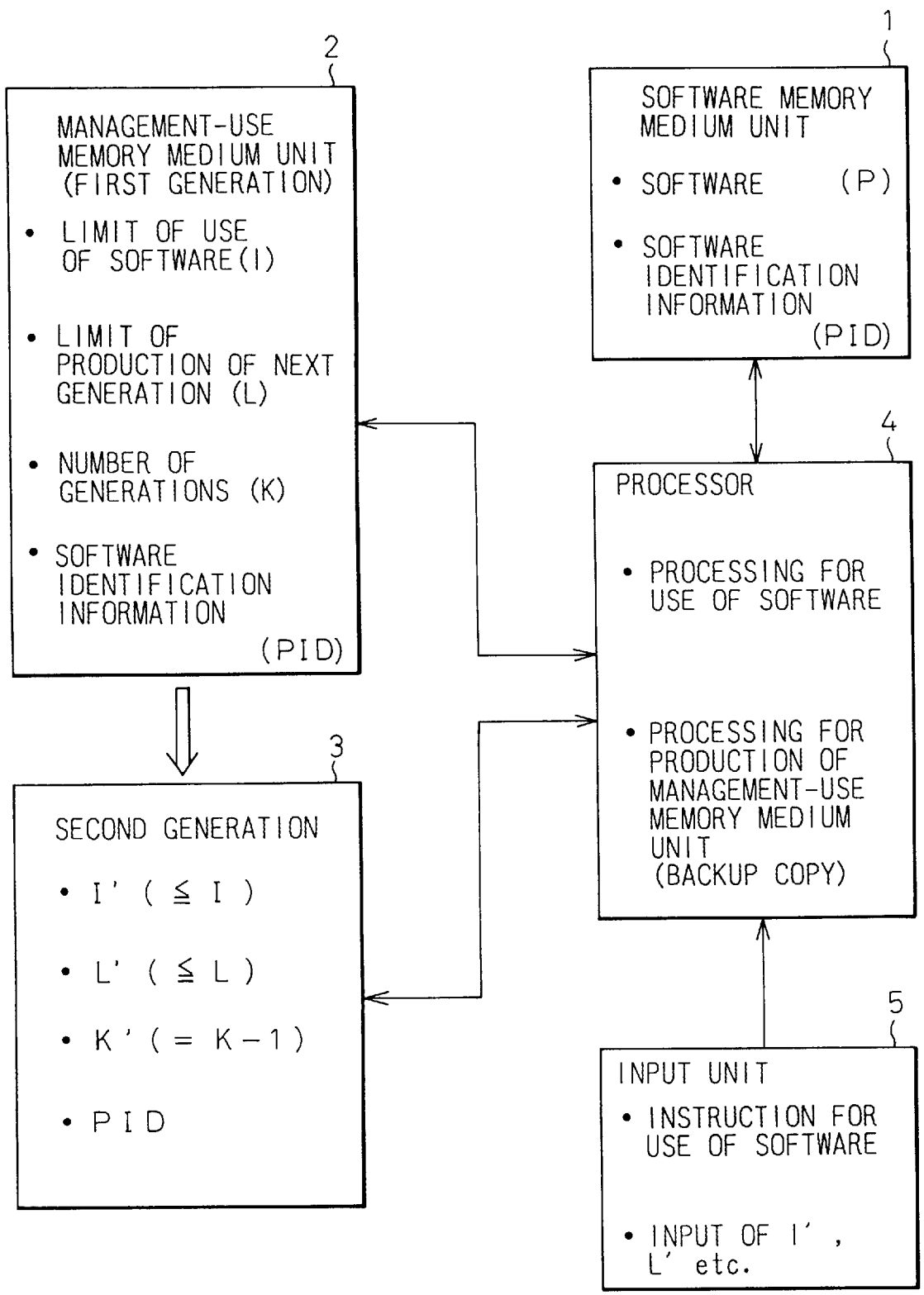
FIG. 1 is a view explaining the principle of the present invention.

FIG. 1 is a view explaining the principle of the present invention.

In the figure, 1 is a software memory medium unit, in which is stored various software, i.e., programs, software identification information PID, etc.

Reference numeral 2 is a management-use memory medium unit (first generation), in which is written by the software vendor etc. the limit I of use of the corresponding software (limit of number of times of use, limit of time of use, etc.), the limit L of production of the next generation showing the maximum number of management-use memory medium units of the second generation which can be produced, the number K of generations showing how many generations of management-use memory medium units can be produced from a unit, identification information PID of the software, i.e., program, etc.

Reference numeral 3 is a management-use memory medium unit of the second generation, in which is written like with the first generation the limit I' of use of the software, the limit L' of production of the next generation, the number K' of generations, and the identification information PID, Note that these data are set so that "I'≦I, L'≦L, and K'=K−1". Further, the limit L' of production of the next generation is set when a management-use memory medium unit of the third generation can be produced.

Reference numeral 4 is a processor, which performs processing for using the software within the range of the limits I, I' . . . of use and processing for production of the management-use memory medium units.

Reference numeral 5 is an input unit, which is used for inputting the commands for execution of software, the limit I' of use of the software, and the limit L' of production of the next generation.

Here, when production of a next generation of a management-use memory medium unit is not permitted, the limits L, L' . . . of production of the next generation and the number K, K' . . . of generations are set to the values "0".

Further, when the software memory medium unit 1 and the management-use memory medium units 2 and 3 are provided in a single memory medium, at least the latter identification information PID may be omitted.

The memory medium used as the software memory medium unit 1 and the management-use memory medium units 2 and 3 may be of any type. For example, use may be made of memory media such as floppy disks, magnetic hard disks, semiconductor disks, optical disks, IC cards, magnetic cards, etc.

Use may be made of both a system of separate management in which the software memory medium unit 1 and the management-use memory medium units 2 and 3 are realized using separate memory media and a system of unitary management in which the two are provided in the same memory medium. Note that in the case of the separate management system, a match of the identification information PID in the software memory medium unit 1 and that on the management-use memory medium units 2 and 3 is the first condition for permitting use of the software.

Of course, any of these memory media may be selected, but in the following explanation, for convenience sake, the examples are used of a separate management system using a floppy disk as the software memory medium unit 1 and using IC cards as the management-use memory medium units 2 and 3 and a unitary management system using an IC card.

The present invention does not establish linkage between a computer and software using identification information as in the past, but instead sets regulatory information comprised of the limit of use of the software etc. in correspondence with the software and permits use of the software within the range of the regulatory information.

Therefore, the software vendor etc. can set the limit of use of the software with the software user and therefore manage the source of the software.

Further, they can permit production of second generation, third generation, and other generations of the management-use memory medium units and thereby increase the convenience of the software users and not detract from the ability of the software vendors etc. to manage the source of the software.

FIGS. 2A and 2B and FIGS. 3A and 3B are views explaining various modes of management of the use of software. Types 1A to 3A show the separate management system, while types 1B to 3B show the unitary management system.

Types 1A and 1B of FIGS. 2A and 2B show the cases where production of backups is not allowed for IC cards s in which regulatory information is written, floppy disks t in which software is stored, or IC cards u in which both regulatory information and software are written.

Type 2A of FIGS. 2A and 2B shows the case where production of a maximum of M number of backup copies t' of the original floppy disk t is allowed. Further, type 2B shows the case where production of a maximum of L number of backup copies u' of the IC card u is allowed.

Type 3A of FIG. 3A shows the case where production of a maximum of L number of the next generation of IC cards is allowed for each IC card until the (K+1) generation and production of a maximum of M number of backup copies t' of the original floppy disk t (not shown) is allowed for each of the IC cards s and s'. Further, type 3B shows the case where production of a maximum of L number of next generation IC cards u' is allowed for each IC card up to the (K+1) generation. Note that the first number in the double-digit number appended to s etc. shows the number of the generation, while the second number shows the number of the copies in the generation.

In the type 3A separate management system, the time when "L=0, K=0, M=0" corresponds to the type 1A separate management system, while the time when "L=0, K=0, M≠0" corresponds to the type 2A separate management system. Further, in the type 3B unitary management system, the time when "L=0, K=0," corresponds to the type 1B unitary management system, while the time when "L≠0, K=1" corresponds to the type 2B unitary management system.

In the case of the type 1A to 3A separate management systems, the software can be used only when one of the IC cards s and s' and one of the floppy disks t, t' is set in the processing units and there is a match between the identification information PID of the software written in advance in the two.

Here, the methods for finding the amount of use of the software of the IC cards at the time when software is executed using the IC cards s, s', u, and u are to note the amount of use i of the software at that time in the region of the limit of software use and find the difference between the two values, update the limit I of use of the software (=amount by which the software may be used) by the difference between "I−i" instead of noting the value as above, etc.

The latter method, however, is not conducive to the non-modification method mentioned next. Note that these methods may be similarly applied to the case of finding the amount of IC cards which can be subsequently made when making a next generation IC card.

In both of the separate management system and the unitary management system, the limit I of use of the software of an original IC card when preparing a next generation IC card may be processed by:

the subtraction method where the limit of use of software specified by the next generation IC card is made I' (≦I) and the value of "I—I'" is made the new limit of use of the software, the non-modification method where the limit of use of software before production of the next generation is maintained, etc.

In the case of the former subtraction method, the amount of use of the software of the entire IC card family derived from the first generation IC card never exceeds an initial value of a limit of use of software of the first generation, and the software vendor etc. can reliably manage the software by this initial value.

On the other hand, when the latter non-modified method is used, the amount of use of the software of the IC card family as a whole is managed under terms easier than the subtraction method by use of the above-mentioned limit L of production of next generation and the number K of generations.

Further, the limit L of production of the next generation of the original IC card when producing next generation IC cards may be processed by the same type of methods as the above-mentioned subtraction method and non-modification method. Even when using the non-modification method, the amount of use of the software of the IC card family as a whole is managed through the number K of generations.

An embodiment of the present invention will be explained next referring to FIG. 4 to FIG. 20. Note that in the following embodiment, for convenience in explanation, the case of the separate management system is mainly covered, an IC card is abbreviated as a "card", the original copy of a floppy disk storing the software is abbreviated as an "original file", a backup copy of the same as a "backup file", card identification information as a "card ID", software identification information as "software ID", and a limit I of use of software as "software use limit I" when necessary.

FIG. 4 is a view explaining a table for management of regulatory information of a first generation card. It is comprised of items such as the software identification information PID, limit I of use of the software, limit L of production of the next generation, number K of generations, limit M of production of backup files, and basic random number r for the later-mentioned enciphering. The software identification information PID is comprised of the name of the software, the number of the version, and the number of the level. Note that the regulatory information management tables in the second generation card, third generation card, . . . are similar.

For example, in the case of the first generation card of type 2A of FIG. 2A, production of a second generation card is not allowed. Further, a maximum of only five backup files is allowed. This group of the total six backup files and original file is set to enable the software to be used a total of 100 times.

In the case of a first generation card of type 3A of FIG. 3A, production of a maximum of four second generation cards and a maximum of four third generation cards for each second generation card (a maximum of a total of 16 third generation cards) is allowed and production of a maximum of two backup files for each of these cards (a maximum of a total of 42 backup files) is allowed. In addition, the group of the backup files and original files is set to allow use of the software for a total of 100 times.

Figure 5:
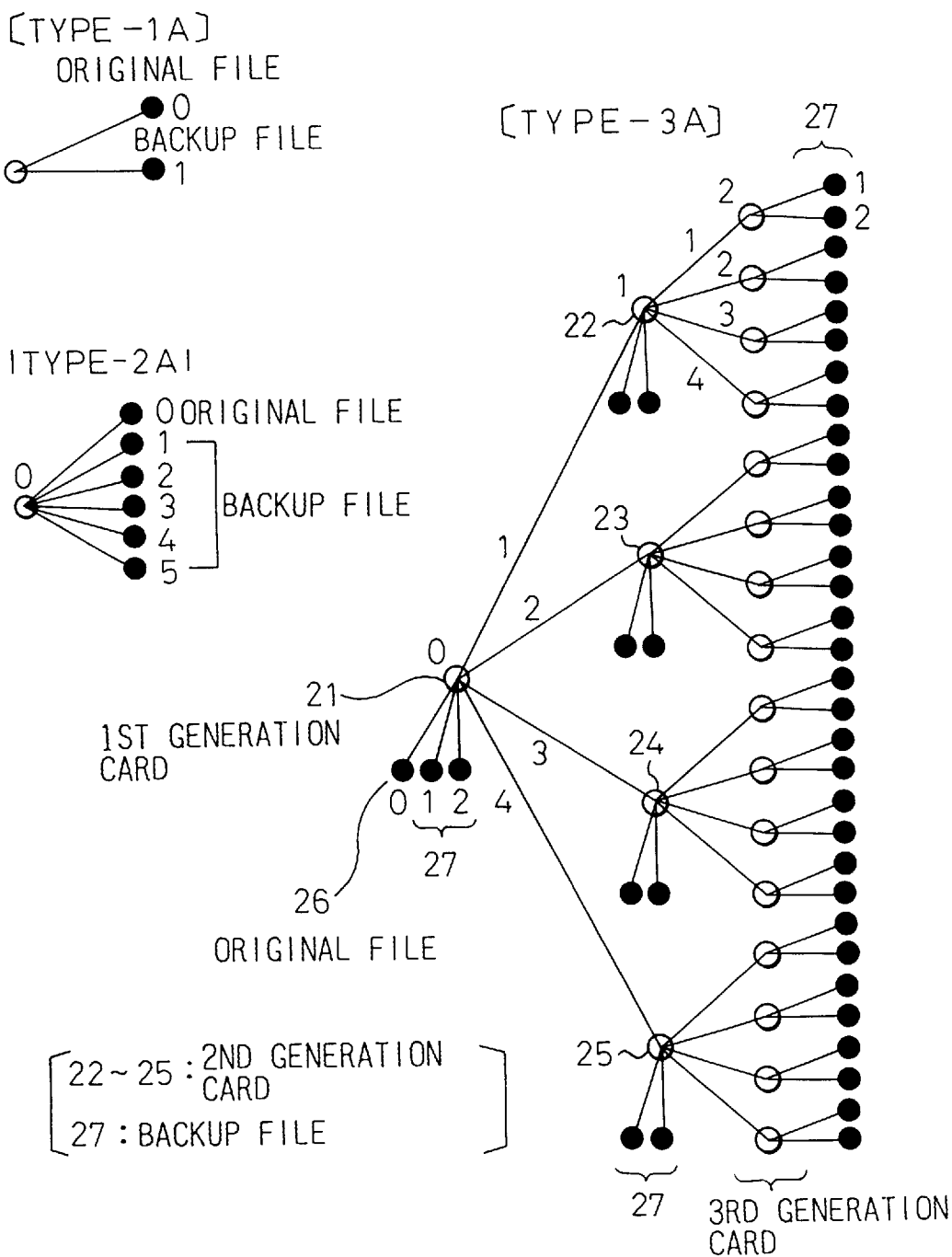
FIG. 5 is a view explaining the production of a maximum number of backup files in accordance with the regulatory information management table of FIG. 4.

FIG. 5 is a view explaining the production of a maximum number of backup files in accordance with the regulatory information management table of FIG. 4. For example, in the case of type 3A, it will be seen that four second generation cards 22 to 25 are produced from the first generation card 21 and that four third generation cards are produced from each of these second generation cards. Note that 26 shows an original file, and 27 is a backup file.

FIG. 6 is a view explaining a regulatory information management table of first generation to third generation cards. The initial values of I, L, K, and M of the first generation card (identification information C00) are set to the same values as the first generation card of type 3A of FIG. 5.

Here, L (=4) number of second generation cards 32 to 35 (identification information C11 to C14) are produced from the first generation card 31. At that time, the L' of each of the second generation cards 32 to 35, that is, the maximum number of third generation cards which can be produced from the second generation cards, is set to "1".

Next, L' (=1) number of third generation cards 36 to 39 (identification information C21 to C24) are produced from each of the second generation cards 32 to 35 and therefore the number of the cards from the first generation to third generation becomes nine, i.e., "1+4+4".

Further, the limit I' and limit I" of use of the software in the second generation cards 32 to 35 and third generation cards 36 to 39 are set to "5" and "3", respectively. The cards can be used to use the software for exactly the set number of times.

When setting the limits I' and I" of use, the limit of use of the software of the original card is reduced by exactly those amounts (I', I"). That is, the limit of the first generation card 31 is reduced by "5" each time a second generation card is produced and finally becomes "80". The I' of each of the second generation cards 32 to 35 is reduced by "3" and changed to "2" since one third generation card C21 to C24 (corresponding to own second generation card) is produced.

The values of the numbers K, K', and K" of the generations are reduced by "1" at each generation from the "2" of the first generation card and become "0" at the third generation card. To prevent any fourth generation card or later card from being produced, the generation of card which can be produced down to is specified by the value K of the first generation card.

In this way, K, K', K", . . . are by nature reduced by "1" with each generation, but the limits I', I", . . . of use of the software, the limits L', L', . . . of the production of the next generation, and the limits M', M", . . . of the production of backup files of the second generation cards on may be set to any value under predetermined conditions, that is, within the range of the value of the corresponding original backed up card (for example, the first generation card in the case of a second generation card) for the limit of use of the software or within the range of the value of the first generation card for the limit of production of backup cards and the limit of production of backup files.

FIGS. 7A and 7B are views explaining the procedure for producing a next generation card, wherein 41 is a first generation card, 42 is a second generation card, 43 is a card processing unit on the computer side, 44 is a deciphering unit, 45 is a control program (CP), 46 is an enciphering unit (E), 47 is a subtractor, 48 is a regulatory information management table, 49 is an enciphering unit, 50 is a deciphering unit, 51 is a regulatory information management table, 52 is an input/output unit (TTY: teletypewriter, i.e., keyboard), 53 is an enciphering unit, 54 is a register, 55 is a gate, 56 is a comparator, and 57 is a deciphering unit (D).

The procedure for producing a next generation card is as follows:

First, a first generation card 41 is loaded into the card processing unit 43. The processing there is shown by the following steps <1> to <6>:

<1> The input/output unit 52 sends to the card 41 its own identification information TTY ID and a request for instruction of a display REQ1 of the regulatory information management table 48 of the card 41.

<2> Receiving this, the card 41 sends to the input/output unit 52 the card identification information C00, the software identification information PID, and the regulatory information I, L, K, and M (I=100, L=4, K=2, M=2) written in it.

<3> The card processing unit 43 sets the regulatory information of the second generation card 42 under the restrictions of the above information. For example, it sets "I'=5, L'=1, K'=1, M'=2" and prepares information REQ2 for instruction of distribution comprised of this so set regulatory information and the former software identification information PID, then enciphers this REQ2 and TTY ID by the key information KL and enciphering unit 53 to obtain the $E_{KL}$ (TTY ID, REQ2) and attaches TTY ID to this and sends the result to the card 41. Note that K', as mentioned above, is specified to a value of the value of the backed up card minus "1", so it is up to the system creator whether to indicate this K' at the card processing unit 43.

<4> The card 41 deciphers the $E_{KL}$ (TTY ID, REQ2) by the deciphering unit 44 and checks the TTY ID and sets the REQ2 through the control program 45 in the subtractor 47. At this time, the control program 45 checks the software identification information PID in the REQ2, the appropriateness of the regulatory information, that is, if the values of I', L', and M' are within the range of the I, L, and MM originally written in the regulatory information management table 48, and if the value of K' is "K−1". Note that here, the content of the check may be made stricter by the software vendor etc. as desired. For example, it is also possible to only allow a value less than 20 percent of I for I'.

<5> The card 41 computes the "I—I'" and "L—L'" for the regulatory information I and L at the subtractor 47 and writes the new regulatory information "I=95, L=3" in the regulatory information management table 48. At this time, the initial value "4" and the computed value "3" are written in parallel for L and the value of "4" is held as the upper limit of the limit L' of production of the succeeding generation cards (third generation cards) designated when producing other next generation cards. That is, here, the above-mentioned subtraction method is assumed to be used for "I" and the non-modification method for "L'".

<6> The card 41 enciphers the REQ2 coming through the control program 45 by the key information KX and enciphering unit 46 to obtain $E_{KX}$ (REQ2), attaches the card identification information C00 to it, and sends the result to the register 54 of the card processing unit 43 and the comparator 56. Note that when there is no K' designated at step <3>, the K' is prepared by the control program 45.

<7> Next, the card 42 is loaded in the card processing unit 43, the REQ3 of the card (request for production) is enciphered by the key information KL by the enciphering unit 49 to obtain $K_{KL}$ (C11, REQ3), the card identification information C11 is attached to this, and the result is sent to the card processing unit 43.

<8> The card processing unit 43 deciphers the $E_{KL}$ (C11, REQ3) by the deciphering unit 57, sends the data content to the comparator 56, judges if the C11 is under the control of the C00 which had been sent at step <6>, that is, if the card loaded at step <7> is of a lower generation than the card loaded at step <1>, and, when the result of the judgement is that it is of a lower generation, opens the gate 55 and sends the $E_{KX}$ (REQ2) stored at the register 54 along with the C11 to the card 42. Note that the deciphering processing at the deciphering unit 57 may be omitted.

<9> The card 42 writes in the regulatory information management table 51 the regulatory information "I'=5, L'=1, K'=1, M'=2" obtained by deciphering the $E_{KX}$(REQ2) by the deciphering unit 50 (see step <3>).

FIG. 8 and FIG. 9 are views explaining the change of the regulatory information management table when using corresponding software using a first generation card. The initial values of the regulatory information of the first generation card are set to "I=5, L=0, K=0, M=1", and the data part of the limit I of use of the software is provided with a region showing the number of times of use of the original file and the number of times of use of the backup file.

According to this regulatory information, production of a second generation card is not allowed. Production of a single backup file and use of the software a total of five times for the original file and backup file are allowed.

Further, the original file has written in it the software identification information (PID), the software (P), the number of times of use of the original file itself, the cumulative number of times of use of the software by the first generation card (total of number of times of use of original file and number of times of use of backup file) and the card identification information in a form enciphered by the key information KX. Further, the backup version has added to it the number of backups.

(1) First, one backup file is produced, whereby the limit M of production of backup files on the first generation card is changed from "1" to "0" and the card identification information and number of backups on the backup file are set to "C00" and "1".

(2) Next, along with a single use of the software of the original file, the number of times of use of the original file on the first generation card is changed from "0" to "1" and the number of times of use, the cumulative number of times of use, and the card identification information on the original file are set to "1", "1", and "C00", respectively.

(3) Next, along with a single execution of the software of the backup file, the number of times of use of the backup file on the first generation card is changed from "0" to "1", the number of times of use on the backup file is changed from "0" to "1", and the cumulative number of times of use is changed from "0" to "2", respectively.

(4) Next, along with two uses of the software of the original file, the number of times of use of the original file on the first generation card is changed from "1" to "3", the number of times of use of the original file on the original file is changed from "1" to "3", and the cumulative number of times of use is changed from "1" to "4", respectively.

(5) Next, along with a single use of the software of the backup file, the number of times of use of the backup file on the first generation card is changed from "1" to "2", the number of times of use on the backup file is changed from "1" to "2", and the cumulative number of times of use is changed from "2" to "5", respectively.

When the software up to step (5) is executed, the number of times of use of the original file on the first generation card is set to "3" and the number of times of use of the backup file is set to "2", so the total becomes "5" as the initial value of the number I of times of use of the software and therefore new use of the software by the first generation card is no longer recognized.

FIG. 10 is a view explaining the change of the regulatory information management table when using software of a backup file produced by a different card, wherein (a) shows the case where software of a backup file 63 of a second generation card of the identification information C11 (hereinafter simply referred to as the "C11 second generation card") is used once using the first generation card of the identification information C00 (hereinafter simply referred to as the C00 first generation card), while (b) shows the case where software of the backup file 64 is used once using the first generation card.

Here, when the use of (a) is ended, the data on the number of times of use and the cumulative number of times of use set in the backup file 63 are not changed, but "1" is written in one of the spare areas 62 of written times of use of the software use limit I region of the C00 first generation card.

As a result, the history of use of the software of the software identification information "A-01" using this card is left intact at the region of the regulatory information management table 61 of the C00 first generation card. Note that when this operation is performed by another party, it is necessary to use the password of the C00 first generation card owner or to obtain the owner's permission. Alternatively, the information on the C11 second generation card may be written in the C00 first generation card in accordance with need.

Next, when the use of the software at (b) is completed, the number of times of use of the backup file of the C00 first generation card is updated from "1" to "2", the number of times of use on the backup file 64 is updated from the previous "2" of the cumulative times of use to "4" (including the times of use of the previous backup file 63), and the total number of times of use of the C00 first generation card is written in the backup file 63 as well.

FIG. 11 is a view explaining the method of detection of use of an unauthorized backup file, in which 65 is a card, 66 is a regulatory information management file, 67 is an enciphering unit, 68 is an unauthorized backup file, 69 is an authorized backup file, 70 is an unauthorized use detection mechanism on the computer side, 71 and 72 are deciphering units, and 73 is a comparator.

Here, the number of times of use is written into each of the backup files 68 and 69, but when an authorized backup file 69 is used after production of a backup file 68 by an unauthorized copy (the number of times of use at this time may be any number, but here a single use is assumed), as shown in (a) of FIG. 10, the numbers of times of use of the card 65 and authorized backup file 69 corresponding to it are set to "i+1", which are larger by "1" than the number of times of use "i" of the unauthorized backup file 68.

Therefore, even if the card 65 is used to try to make use of software of an unauthorized backup file 68, the number of times of use on the card 65, obtained as the output signal of the deciphering units 71 and 72 of the unauthorized use detection mechanism 70, and that on the backup file 68 do not match and a "NO" signal to the effect that the processing of the software is not recognized, is output from the comparator 73.

Figure 12:
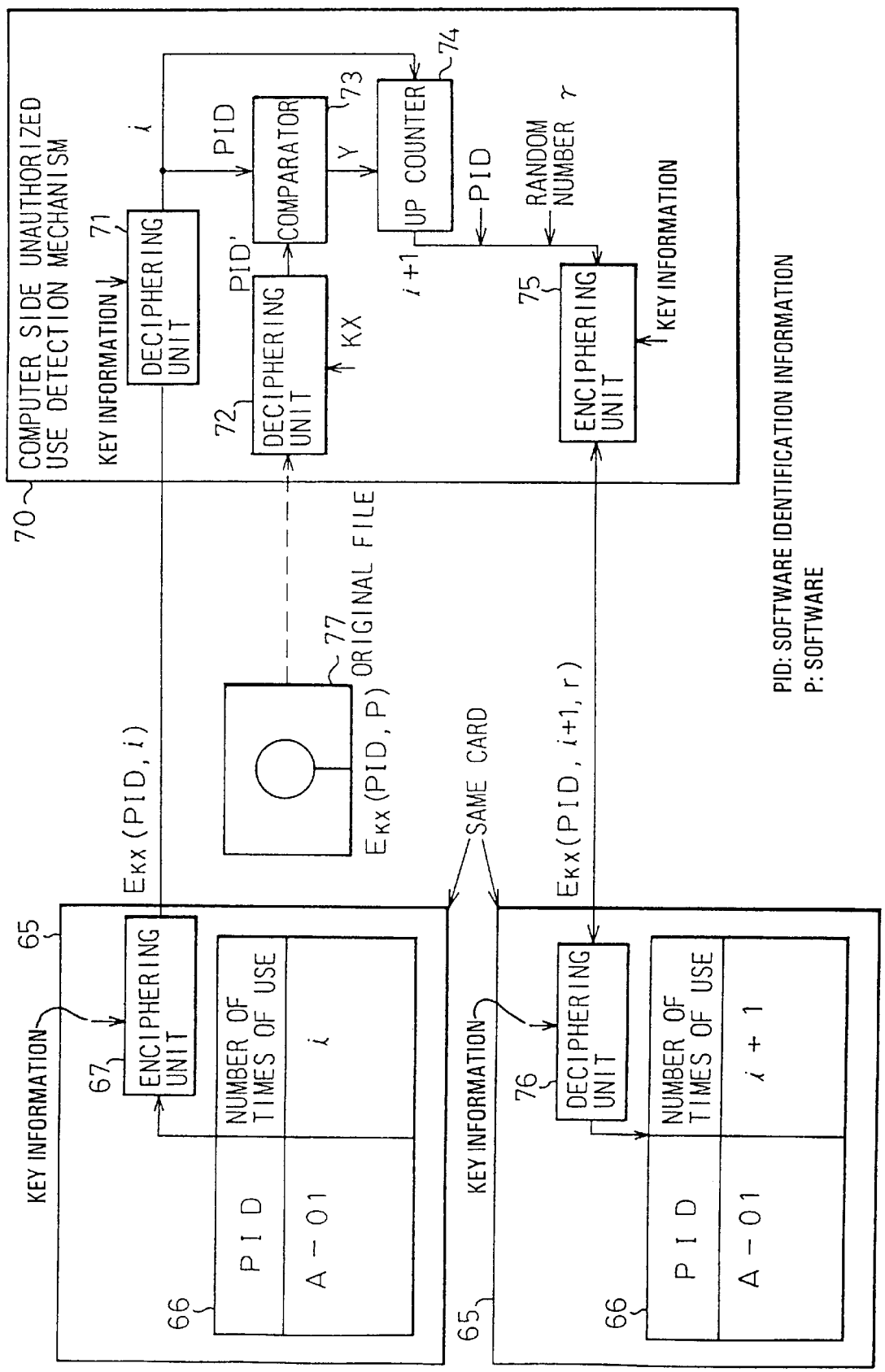
FIG. 12 is a view explaining a system of management enabling free production of backup files.

FIG. 12 is a view explaining a system of management enabling free production of backup files. The system comprises the unauthorized use detection mechanism 70 of FIG. 11 plus the up/down counter 74 and enciphering unit 75 and the card 65 plus the deciphering unit 76. Further, the configuration makes use of the original file 77.

Here, when the card 65 and the original file 77 are loaded in the processing units, the software identification information PID and number i of times of use of the regulatory information management table 66 of the former are enciphered by the key KX by the enciphering unit 67, are sent to the unauthorized use detection mechanism 70 in the enciphered state, and are input through the deciphering unit 71 to the comparator 73.

On the other hand, enciphered software identification information PID is sent from the original file 77 as well to the unauthorized use detection mechanism 70 and input through the deciphering unit 72 to the comparator 73. At the comparator 73, it is checked if the PID's match.

If the result is "YES", the number of times of use i is updated to "i+1" by the operation of the up/down counter 74, the updated value and the former card 65 side PID are enciphered by the key KX at the next enciphering unit 75, and the result is returned to the card 65. The original "i+1" and "PID" are found by the deciphering unit 72 and the content of the regulatory information management table 66 is updated by this data.

Figure 13A:
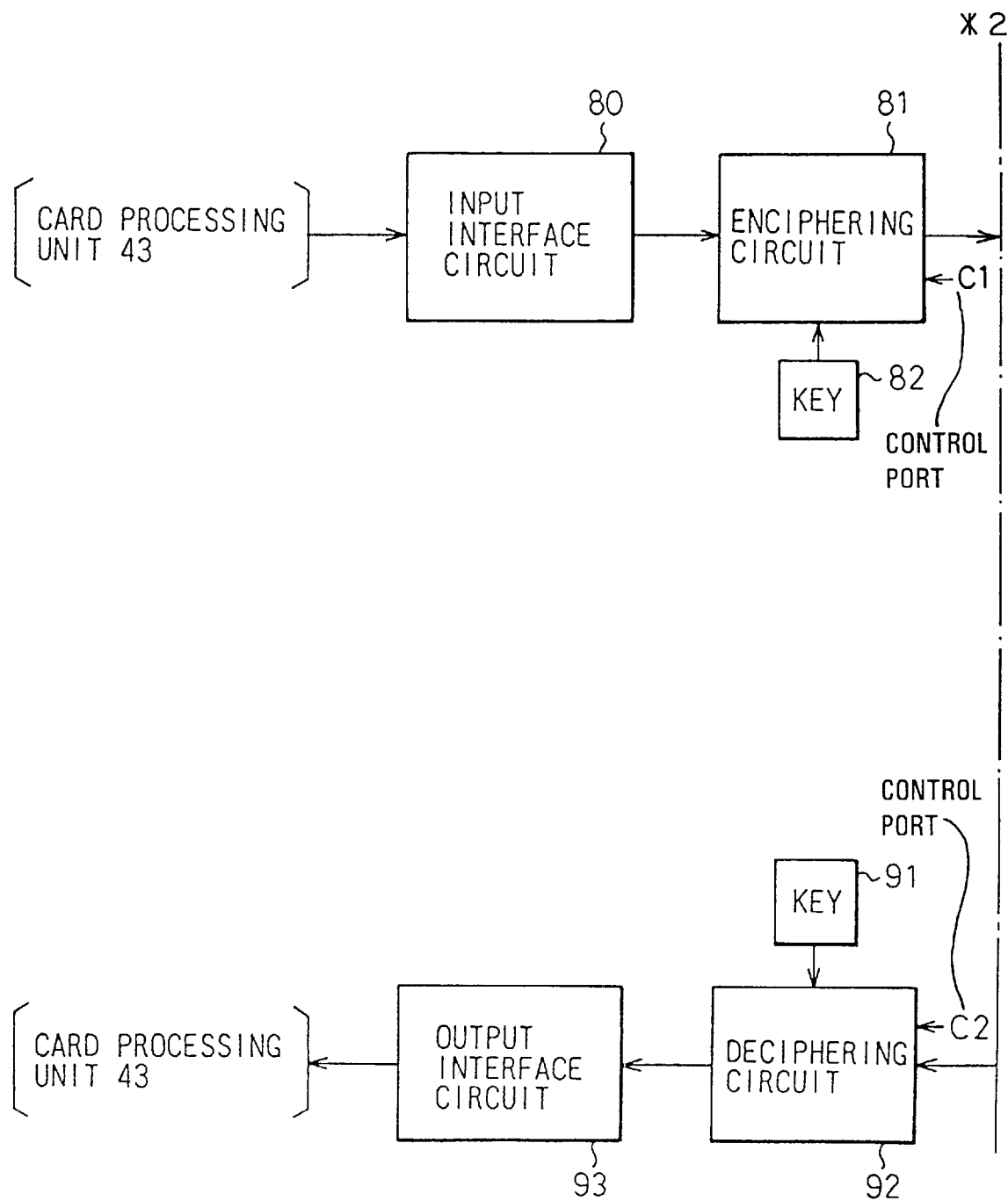
FIGS. 13A and 13B are views explaining an example of the configuration at the card side of FIGS. 7A and 7B.
Figure 13B:
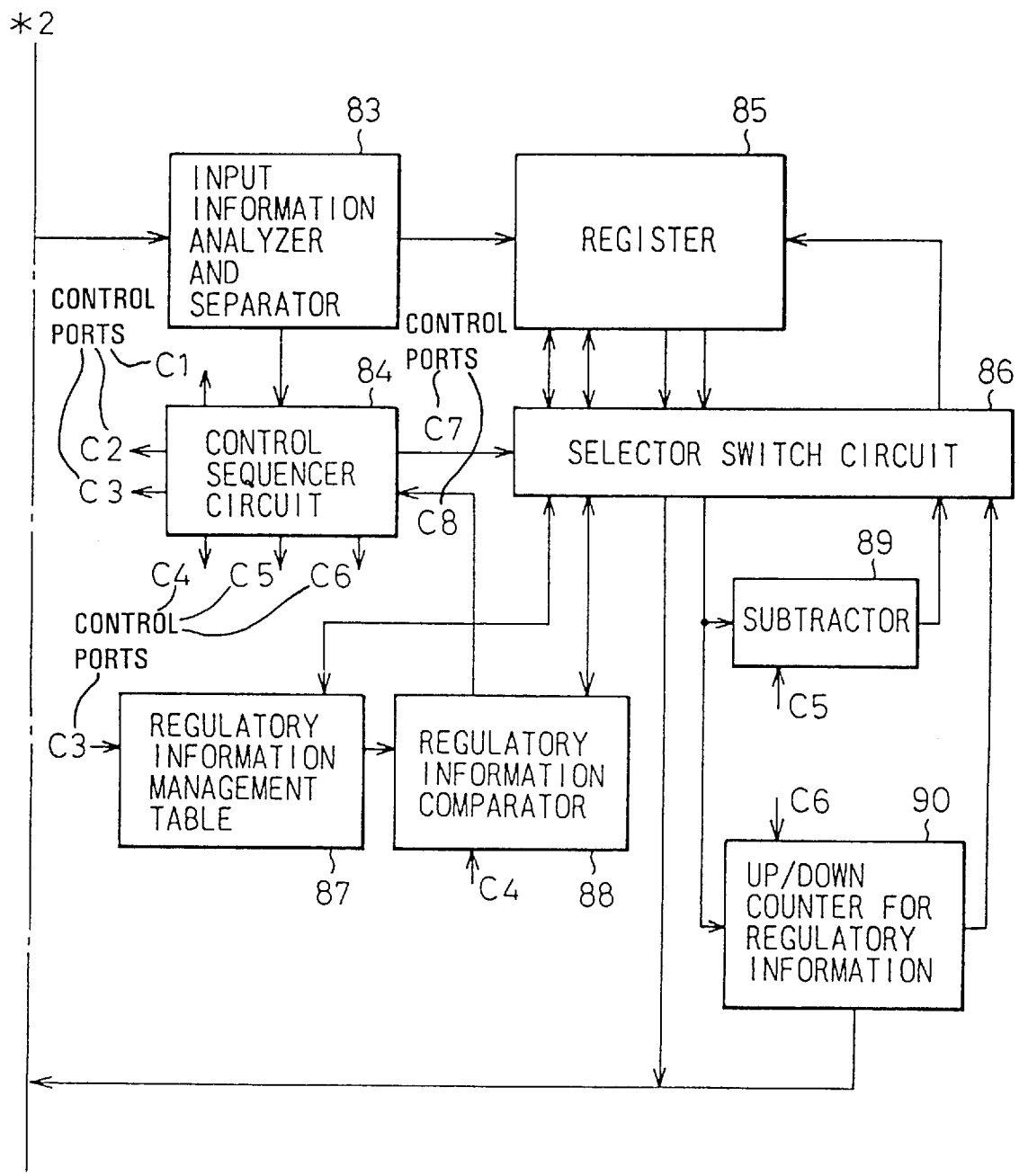

FIGS. 13A and 13B are views explaining an example of the configuration at the card side of FIGS. 7A and 7B, in which 80 an input interface circuit, 81 is a deciphering circuit, 82 is a key, 83 is an input information analyzer and separator, 84 is a control sequencer circuit, 85 is a register, 86 is a selector switch circuit, 87 is a regulatory information management table, 88 is a regulatory information comparator, 89 is a comparator, 90 is a regulatory information up/down counter, 91 is a key, 92 is an enciphering circuit, and 93 is an output interface circuit. Further, C1 to C8 show control ports.

Figure 14:
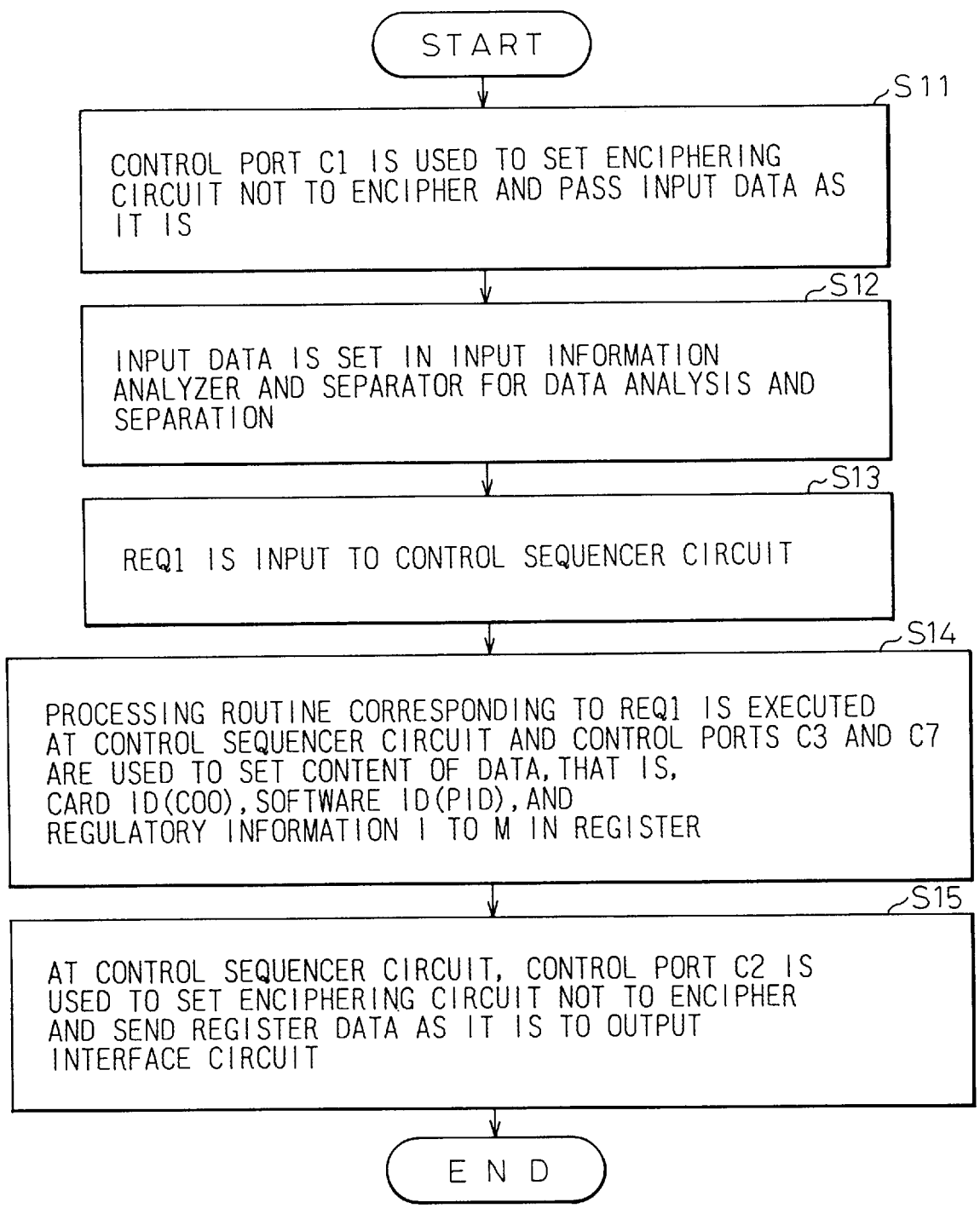
FIG. 14 is a view explaining the processing procedures of <1> and <2> at the card side of FIGS. 7A and 7B.

FIG. 14 to FIG. 16 are views explaining the processing procedures at the card side of FIGS. 7A and 7B.

FIG. 14 is a view explaining the processing procedures of <1> and <2> at the card side of FIGS. 7A and 7B.

At step S11, control port C1 is used to set the enciphering circuit 81 not to encipher and input the TTY ID and REQ1 from the card processing unit 43 as they are in the input information analyzer and separator 83.

At step S12, the input data is subjected to processing to analyze and separate it at the input information analyzer and separator 83.

At step S13, the REQ1 is taken out and input to the control sequencer circuit 84.

At step S14, the control ports C3 and C7 are used to set the card ID, software ID, and regulatory information I to M of the regulatory information management table 87 in the register 85 based on the content of the REQ1.

At step S15, the control port C2 is used to set the enciphering circuit 92 not to encipher and send the register data as it is to the output interface circuit 93.

FIG. 15 is a view explaining the processing procedures of <3> to <5> at the card side of FIGS. 7A and 7B.

At step S21, the control port C1 is used to set the enciphering circuit 81 not to encipher and input the plain text (TTY ID) in the data from the card processing unit 43 as it is in the input information analyzer and separator 83.

At step S22, the control port C1 is used to activate the deciphering circuit 81, decipher the enciphered portion $E_{KL}$ (TTY ID, REQ2) in the data from the card processing unit 43, and input the deciphered text of the TTY ID in the input information analyzer and separator 83. At this time, the deciphered text of REQ2 is set in the register 85.

At step S23, when the TTY ID of the plain text and the TTY ID of the deciphered text match, REQ2 is set in the control sequencer circuit 84 and the corresponding routine is executed. At this time, the control ports C3 and C5 are used, the subtractor 89 is set with the regulatory information I to L of the regulatory information management table 87 and the regulatory information I' to L' in the deciphered text of the REQ2, and the content of the regulatory information management table 87 is updated by the results of subtraction.

At step S24, the REQ2 (deciphered text) set in the register 85 is enciphered by the enciphering circuit 92 and sent to the output interface circuit 93.

Figure 16A:
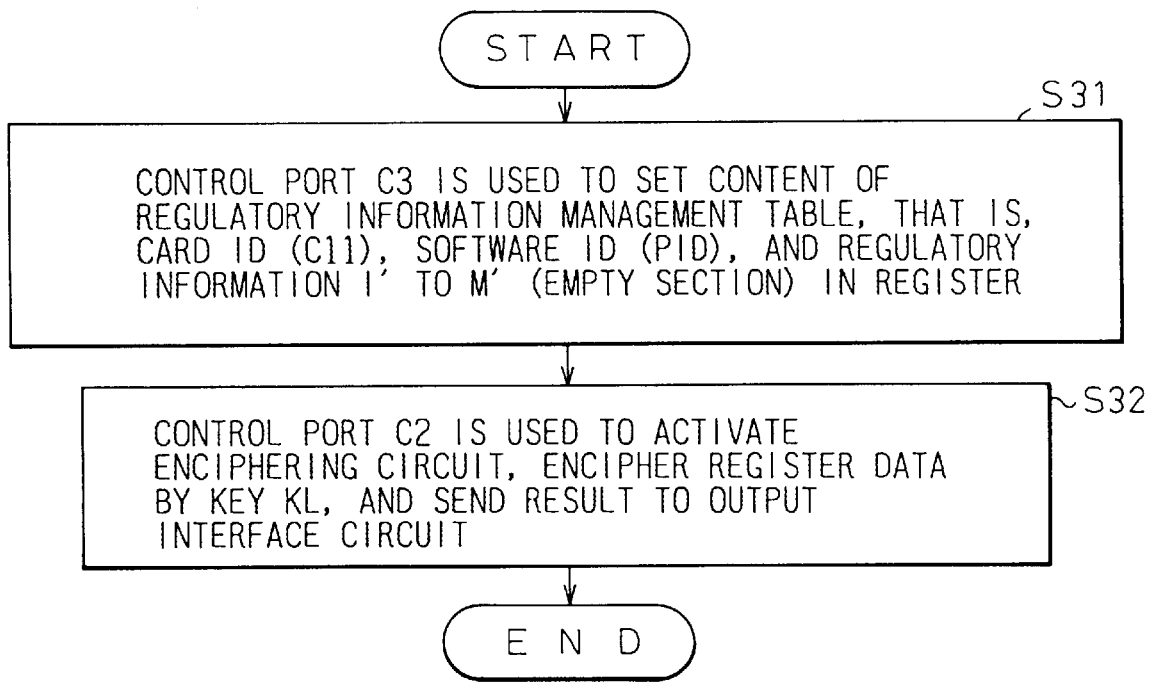
FIGS. 16A and 16B are views explaining the processing procedures of <7> and <9> at the card side of FIGS. 7A and 7B.
Figure 16B:
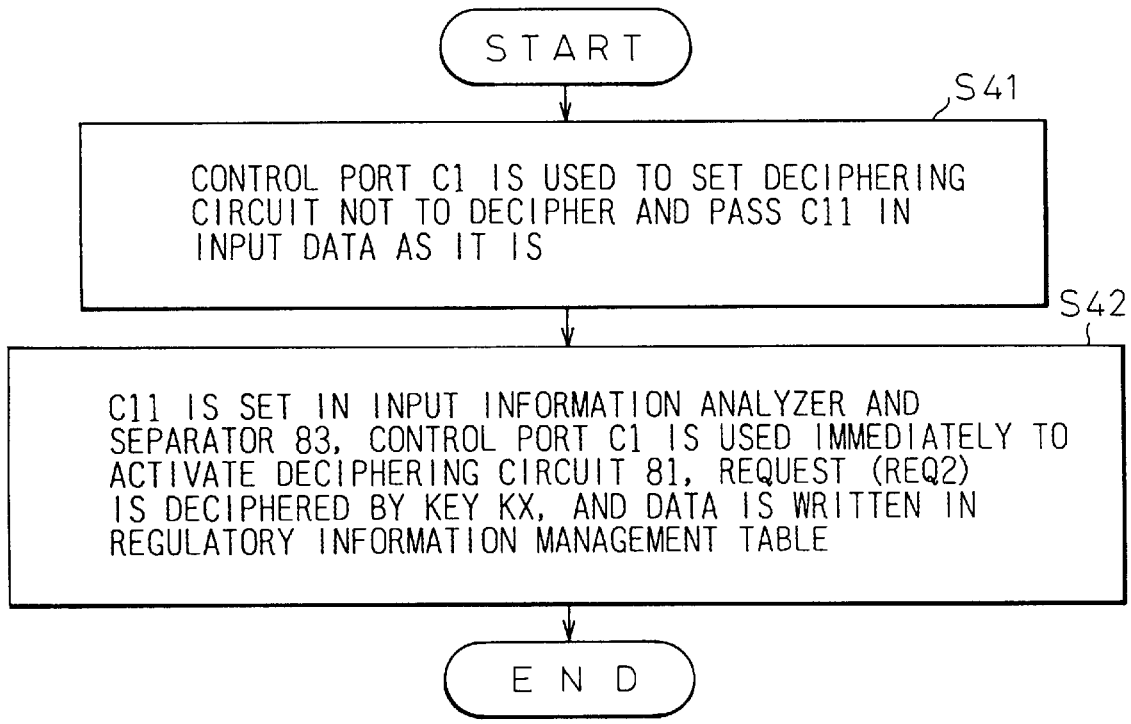

FIGS. 16A and 16B are views explaining the processing procedures of <7> and <9> at the card side of FIGS. 7A and 7B.

At step S31, the control port C3 is used to set the card ID, software ID, and regulatory information I' to M' (empty section) of the regulatory information management table 87 of the card 42 in the register 85.

At step S32, the control port C2 is used to activate the enciphering circuit 92, encipher the register data, and send the result to the output interface circuit 93.

At step S41, the control port C1 is used to set the deciphering circuit 81 not to decipher and pass the card ID (C11) in the input data as it is.

At step S42, C11 is set in the input information analyzer and separator 83, the control port C1 is used immediately to activate the deciphering circuit 81, the enciphered portion in the input data, that is, $E_{KX}$(PID, I', L', K', M') is deciphered by the key 91 and the deciphered data is written in the regulatory information management table.

Figure 17A:
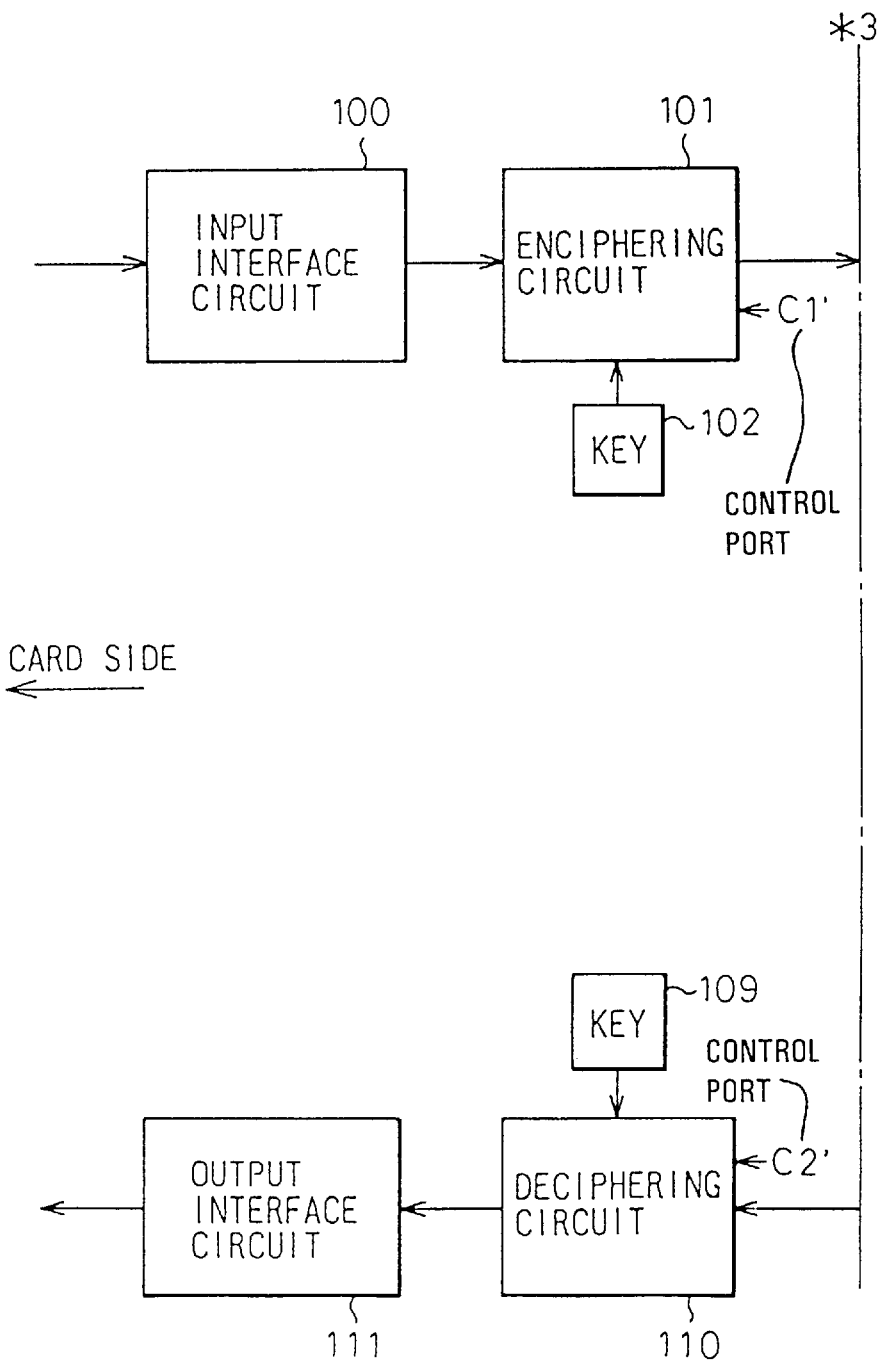
FIGS. 17A and 17B are views explaining an example of the configuration at the card processing unit (computer) side of FIGS. 7A and 7B.
Figure 17B:
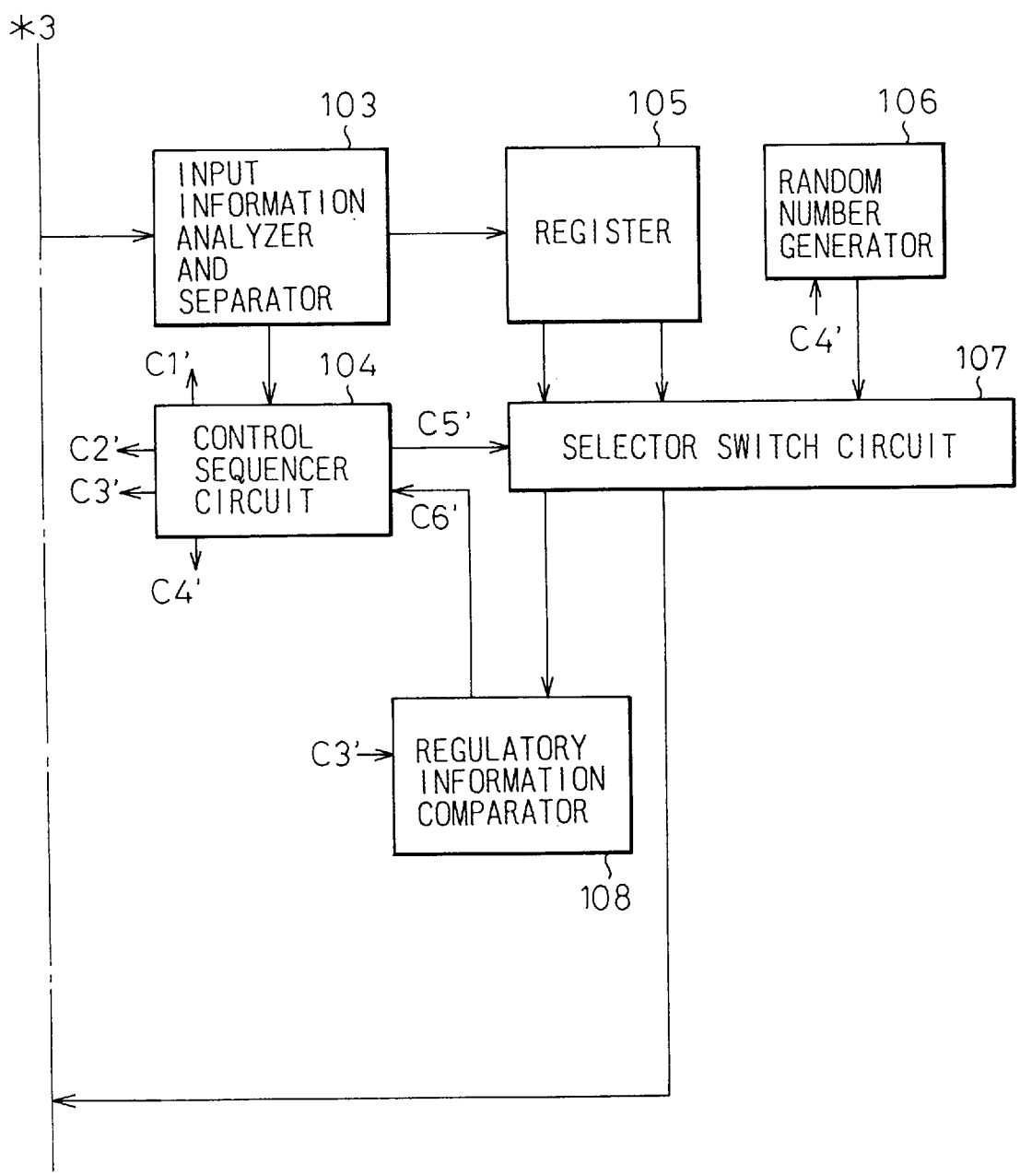

FIGS. 17A and 17B are views explaining an example of the configuration at the card processing unit (computer) side of FIGS. 7A and 7B, wherein 100 shows an input interface circuit, 101 a deciphering circuit, 102 a key, 103 an input information analyzer and separator, 104 a control sequencer circuit, 105 a register, 106 a random number generator, 107 a selector switch circuit, 108 a regulatory information comparator, 109 a key, 110 an enciphering circuit, 111 an output interface circuit, and C1' to C6' control ports.

Figure 18:
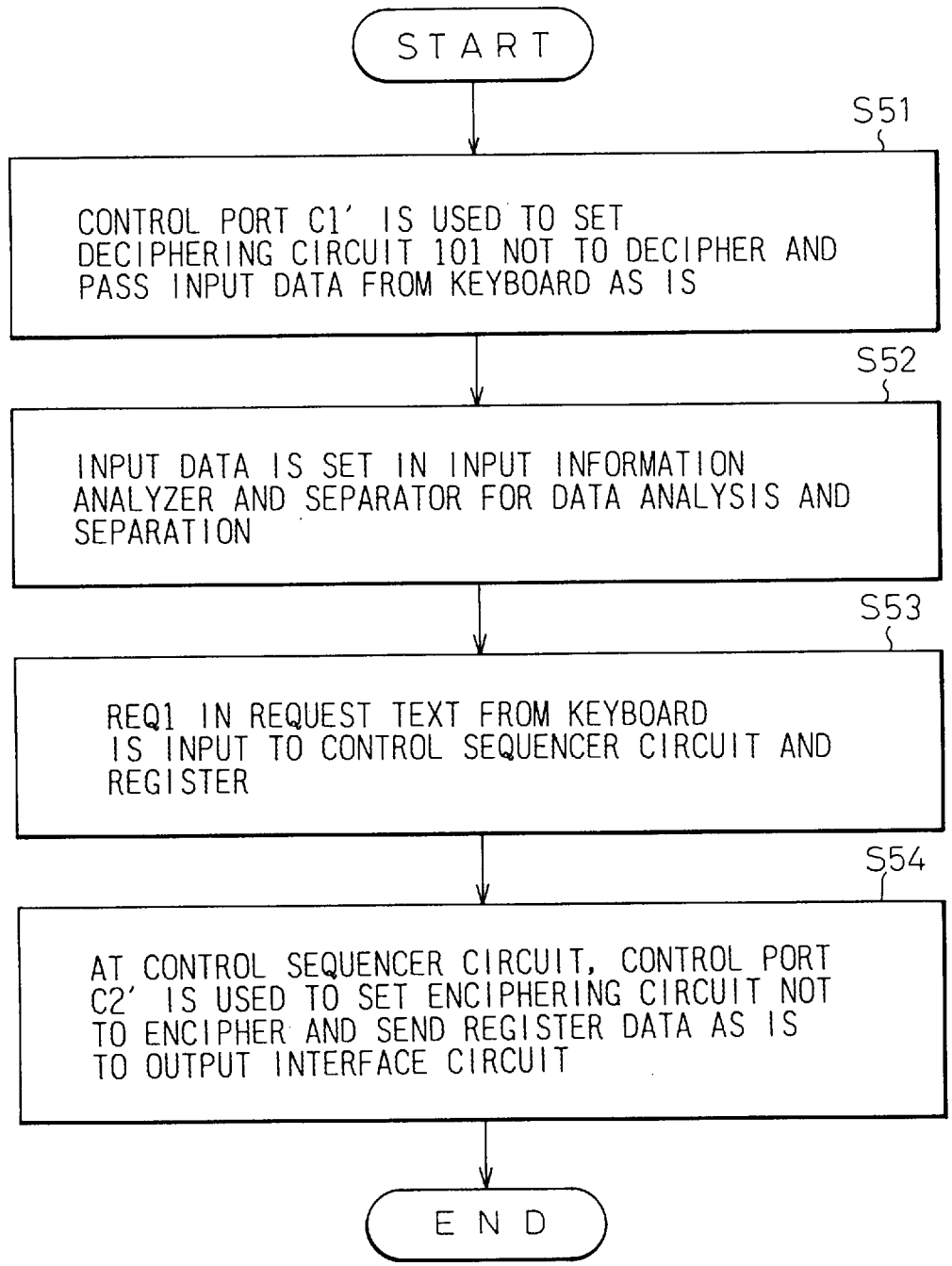
FIG. 18 is a view explaining the processing procedures of <1> at the card processing unit side of FIGS. 7A and 7B.

FIG. 18 to FIG. 20 are views for explaining the processing procedures at the card processing unit (computer) side of FIGS. 7A and 7B.

FIG. 18 is a view explaining the processing procedures of <1> at the card processing unit side of FIGS. 7A and 7B.

At step S51, the control port C1' is used to set the deciphering circuit 101 not to decipher and pass the input data from the keyboard, that is, REQ1 etc., as is.

At step S52, the input data is set in the input information analyzer and separator 103.

At step S53, the REQ1 is input to the control sequencer circuit 104 and register 105.

At step S54, the control port C2' is used to set the enciphering circuit 110 not to encipher and send the register data as is to the output interface circuit 111.

FIG. 19 is a view explaining the processing procedures of <2> and <3> at the card processing unit side of FIGS. 7A and 7B.

At step S61, the control port C1' is used to set the deciphering circuit 101 not to decipher and pass the input data from the card 41, that is, the card ID, software ID, and regulatory information (C00, PID, I, L, K, and M) as it is.

At step S62, the input data is set in the input analyzer and separator 103.

At step S63, the regulatory information (I, L, K, and M) is input to the control sequencer circuit 104 and register 105.

At step S64, the control port C2' is used to set the enciphering circuit 110 not to encipher and send the register data as it is to the output interface circuit 111.

FIG. 20 is a view explaining the processing procedures of <6> to <8> at the card processing unit side of FIGS. 7A and 7B.

At step S71, among the $E_{KX}$ (PID, I', L', K', M') and C)) sent from the card 41, C00 (card ID) is set as it is in the input information analyzer and separator 103 and register 105.

At step S72, the control port C1' is used to activate the deciphering circuit 101, the enciphered data from the card 42 is deciphered to find C11 (card ID), then the generational relationship between the C11 and C00 is judged by the regulatory information comparator 108.

At step S73, when a predetermined generational relationship is recognized between the two, the register data is sent as is through the output interface circuit 111 to the card 42.

In the explanation of the above embodiment, use was made of the number of times of use of the software as the limit of use of the software, but the invention is not limited to this. It is of course possible to set the limit of use by the time of use of the software as well.

The present invention, as mentioned above, allows the use of software under restrictions of regulatory information (limit of use of software, limit of production of backup versions, number of generations for management-use memory medium, etc.) set in an IC card or other management-use memory media, so the software vendor etc. can prevent unauthorized use of software by managing this regulatory information.

Further, the range of allowable backups of the management-use memory medium is also restricted by this regulatory information, so the invention is extremely convenient for use of software on other computers of the same model by a number of persons or the same person at a number of locations through the production of a predetermined number of second generation cards, third generation cards.

We claim:

1. A memory medium, comprising:
   a card having a management portion functioning to manage an amount of use of software, said management portion retaining therein regulatory information designating at least a limit of use of the software thereby to manage the amount of use of the software;

said regulatory information designating a limit of production of backup copies of said memory medium, production of backup copies of said memory medium being allowed within the range of said limit of production; and at a time of production of said backup copies of said memory medium, the regulatory information of said backup copies are set with individual limits of use within the range of an overall limit of use, and use of the software by said backup copies is allowed within the range of the individual limits of use.

2. A memory medium as set forth in claim 1, wherein when a backup copy of said memory medium is produced, a limit of use of said memory medium is changed by rewriting the limit of use to a value of the limit of use minus the set individual limits of use.

3. A memory medium as set forth in claim 1, wherein said memory medium has, integral with said management portion, a software memory portion for storing the software.

4. A software use management system which manages an amount of use of software stored in a software memory medium, comprising:

a management-use memory medium, formed as a card, having regulatory information written therein designating at least a current limit of use of the software, thereby to manage further use of the software during an off-line mode, said regulatory information designating a limit of backup copies of said management-use memory medium which can be produced, backup copies of said management-use memory medium being allowed within a range of up to said limit of backup copies and, when a production of backup copies of said management-use memory medium is to be achieved, said regulatory information of each of the backup copies is set with an individual limit of use within a range of said limit of use, to allow the use of the software by the backup copies as well within the range of said individual limit of use thus set, said regulatory information in said management-use memory medium being referred to at a current time of use of the software to allow subsequent use of the software at the current time within a range prescribed by said regulatory information;

each time the software is used, said regulatory information in said management-use memory medium being rewritten in accordance with the amount of use of the software; and each subsequent amount of use of the software being restricted, based on said rewritten regulatory information.

5. A software use management system as set forth in claim 4, wherein when a backup version of said management-use memory medium is produced, said limit of use of said management-use memory medium is changed by rewriting said limit of use to a value of said limit of use minus said individual limit of use thus set.

6. A software use management system as set forth in claim 4, wherein:

said management-use memory medium and said software memory medium comprise a single memory medium.

7. A software use management system as set forth in claim 4, wherein provision is made of a card processing unit for cooperating with a computer using the software, and said card processing unit is loaded from said management-use memory medium and writes said regulatory information in said management-use memory medium, and said regulatory information in said management-use memory medium is selectively rewritten to be updated when the software is used.

8. A software use management system as set forth in claim 7, wherein said management-use memory medium means includes control means for selectively controlling the writing and rewriting of said regulatory information.

9. A memory medium, comprising:

a card having a management portion functioning to manage an amount of use of software, said management portion retaining therein regulatory information designating a limit of use of the software thereby to manage the amount of use of the software; and said regulatory information in said management portion being retained in the form of a regulatory information management table comprising a plurality of management items including at least items comprising software identification information (PID), items showing a number (K) of generations and a limit (L) of production of a next generation, a limit (I) of use of the software and a limit (M) of production of backup files.

10. A memory medium as set forth in claim 9, wherein:

said number (K) of generations is reduced by "1" for each generation;

a value of said limit (I) of use of software is set within a range of values shown in said regulatory information table of said backup files; and values of the limit (L) of production of the next generation and the limit (M) of production of backup files are set within a range of corresponding values shown in said regulatory information table of the backup files.

11. A software use management system which manages an amount of use of software stored in a software memory medium, comprising:

a management-use memory medium, formed as a card, having regulatory information written therein designating at least a current limit of use of the software, thereby to manage further use of the software during an off-line mode, said regulatory information designating a limit on a number of generations of backup copies of said management-use memory medium, and allowing production of backup copies of a relatively lower generation from a backup copy of a relatively higher generation within a range up to the limit on the number of generations;

each time the software is used, said regulatory information in said management-use memory medium being rewritten in accordance with the amount of use of the software; and each subsequent amount of use of the software being restricted based on said rewritten regulatory information.

12. A memory medium, comprising:

a card having a management portion functioning to manage an amount of use of software, said management portion retaining therein regulatory information designating a limit of use of the software thereby to manage the amount of use of the software; and said regulatory information designating a limit on a number of generations of backup copies of said memory medium which is allowed to be produced, and allowing production of backup copies of a lower generation from a backup copy of a higher generation within a range of the limit on the number of generations.

* * * * *